United States Patent
Adyanthaya et al.

(10) Patent No.: US 11,936,702 B2
(45) Date of Patent: Mar. 19, 2024

(54) METHODS AND SYSTEMS FOR GEOLOCATION-BASED MEDIA STREAMING

(71) Applicant: TuneIn, Inc., San Francisco, CA (US)

(72) Inventors: Moksha Adyanthaya, San Francisco, CA (US); Paul Brody, San Francisco, CA (US); Scott Collins, San Francisco, CA (US); Jack Kim, San Francisco, CA (US); Sarah Kate Emerson, San Francisco, CA (US); Yuri Ono, San Francisco, CA (US); Eric Wilcox, San Francisco, CA (US); Richard Stern, San Francisco, CA (US); Nicole Erthein, San Francisco, CA (US); Devki Kalra, San Francisco, CA (US); Joseph King, San Francisco, CA (US); Joseph Gomez, San Francisco, CA (US)

(73) Assignee: TuneIn, Inc., San Francisco, CA (US)

( * ) Notice: Subject to any disclaimer, the term of this patent is extended or adjusted under 35 U.S.C. 154(b) by 0 days.

(21) Appl. No.: 17/989,491

(22) Filed: Nov. 17, 2022

(65) Prior Publication Data
US 2023/0156058 A1 May 18, 2023

Related U.S. Application Data

(60) Provisional application No. 63/296,740, filed on Jan. 5, 2022, provisional application No. 63/296,717, filed
(Continued)

(51) Int. Cl.
*H04L 65/611* (2022.01)
*G06N 20/00* (2019.01)
(Continued)

(52) U.S. Cl.
CPC ............ *H04L 65/611* (2022.05); *G06N 20/00* (2019.01); *H04H 60/46* (2013.01); *H04H 60/54* (2013.01);
(Continued)

(58) Field of Classification Search
CPC ....... H04L 65/611; H04L 67/12; H04L 67/52; G06N 20/00; H04H 60/46; H04H 60/54;
(Continued)

(56) References Cited

U.S. PATENT DOCUMENTS

| | | | |
|---|---|---|---|
| 8,504,073 B2 * | 8/2013 | Svendsen ............. | H04L 67/535 455/456.3 |
| 8,886,584 B1 * | 11/2014 | Kane, Jr. ............... | G06F 16/29 706/46 |

(Continued)

FOREIGN PATENT DOCUMENTS

WO    WO-2020040778 A1 *   2/2020   ............. H04H 60/42

*Primary Examiner* — Javier O Guzman
(74) *Attorney, Agent, or Firm* — Polsinelli LLP

(57) ABSTRACT

Systems and methods are provided for presenting media streams based on changes in geolocation. A MapView system may receive a first positioning signal indicating a first geographical location of a user device. The MapView system may determine a first media stream to be presented by the user device based on the first geographical location and a location of a source of the first media stream. The MapView system may then facilitate a presentation of the first media stream by the user device. When the MapView system receives a second positioning signal indicating a second geographical location of the user device, the MapView may identify, a second media stream to be presented by the user device based on the second geographical location being in broadcast range of the second media stream. The MapView system may then facilitate a presentation of the second media stream by the user device.

20 Claims, 11 Drawing Sheets

Related U.S. Application Data on Jan. 5, 2022, provisional application No. 63/280,425, filed on Nov. 17, 2021.

(51) Int. Cl.
| | | |
|---|---|---|
| *H04H 60/46* | (2008.01) | |
| *H04H 60/54* | (2008.01) | |
| *H04H 60/70* | (2008.01) | |
| *H04L 67/12* | (2022.01) | |
| *H04L 67/52* | (2022.01) | |

(52) U.S. Cl.
CPC ............ *H04H 60/70* (2013.01); *H04L 67/12* (2013.01); *H04L 67/52* (2022.05)

(58) Field of Classification Search
CPC ........ H04H 60/70; H04H 60/42; H04H 60/52; H04N 21/4668; H04N 21/4826; H04N 21/41422

See application file for complete search history.

(56) References Cited

U.S. PATENT DOCUMENTS

| | | | | |
|---|---|---|---|---|
| 10,083,232 | B1* | 9/2018 | Durham | H04N 21/4826 |
| 10,972,206 | B1* | 4/2021 | Calvert | H04W 4/40 |
| 11,388,457 | B2* | 7/2022 | Lee | H04N 21/8106 |
| 2011/0035284 | A1* | 2/2011 | Moshfeghi | H04W 4/029 |
| | | | | 705/14.58 |
| 2011/0066743 | A1* | 3/2011 | Hurley | H04L 67/52 |
| | | | | 709/231 |
| 2011/0238289 | A1* | 9/2011 | Lehmann | G01C 21/3617 |
| | | | | 701/533 |
| 2014/0107916 | A1* | 4/2014 | Urup | G01C 21/3629 |
| | | | | 701/487 |
| 2015/0185030 | A1* | 7/2015 | Monroe | B60W 50/14 |
| | | | | 701/532 |
| 2016/0329977 | A1* | 11/2016 | Williams | H04W 36/32 |
| 2020/0213643 | A1* | 7/2020 | Jennings | H04L 65/80 |
| 2021/0114616 | A1* | 4/2021 | Altman | G01C 21/3889 |
| 2021/0281904 | A1* | 9/2021 | Calvert | H04N 21/25841 |
| 2022/0074756 | A1* | 3/2022 | Gewickey | G06Q 50/14 |

* cited by examiner

METHODS AND SYSTEMS FOR GEOLOCATION-BASED MEDIA STREAMING

CROSS-REFERENCE TO RELATED APPLICATIONS

The present patent application claims the benefit of priority to U.S. Provisional Patent Application No. 63/280,425 filed Nov. 17, 2021, to U.S. Provisional Patent Application No. 63/296,717 filed Jan. 5, 2022, and to U.S. Provisional Patent Application No. 63/296,740 filed Jan. 5, 2022, all of which are incorporated herein by reference in their entirety for all purposes.

TECHNICAL FIELD

This disclosure relates generally to identifying media streams based on geospatial data, and more particularly to identification and routing of media streams according to geospatial data.

BACKGROUND

Broadcast sources operate at fixed geographical locations and broadcast media at particular radio frequencies. Due to the inherent limitations of radio-frequency-based communications, only receivers positioned within range (e.g., within a predetermined distance) of the broadcast source mat be capable of receiving media from the broadcast source. Receivers outside of that range may not receive the media due to the distance and/or interference from other broadcast sources. Thus, for a receiver to continue receiving media from the broadcast source, the receiver may have to remain physically located within range of the broadcast source.

When traveling, receivers may continually drop out of range of broadcast sources. A receiver may attempt to identify new broadcast sources as the receiver comes within range of the new broadcast sources. However, since broadcast sources may operate over a variety of radio frequencies, it may be difficult to identify a radio frequency over which a new broadcast source transmits. Furthermore, even if the radio frequency of a new broadcast source is idented, the media being broadcast may not correspond to the previous broadcast source or user preferences. It may be difficult to identify similar broadcast sources.

To increase their broadcast range and eliminate radio-frequency scanning to identify comparable sources, broadcast sources may broadcast media over alternative communications channels configured to be received over larger geographical areas. A broadcast source may transmit media over a secondary broadcast channel (e.g., such as the Internet, or the like), enabling any device configured to connect to the secondary broadcast channel the ability to receive media from that broadcast source. However, it may be difficult for receivers to identify new broadcast sources operating within particular fixed geographical locations.

SUMMARY

Methods are described herein for presenting media streams based on changes in geolocation. The methods can include receiving a first positioning signal indicating a first geographical location of a user device; determining, based on the first positioning signal, a first media stream to be presented by the user device, wherein the first geographical location is within a broadcast range of the first media stream; facilitating a presentation of the first media stream by the user device; receiving a second positioning signal indicating a second geographical location of the user device; identifying, in response to determining that the second geographical location is different from the first geographical location, a second media stream to be presented by the user device, wherein the second geographical location is within a broadcast range of the second media stream; and facilitating a presentation of the second media stream by the user device.

Additional methods are described herein for presenting media stream sequences based on a planned route. The methods can include receiving route information corresponding to a route in which a user device is planned to travel; generating a sequence of broadcast sources that includes an identification of a set of broadcast sources; presenting a first media stream from a first broadcast sources in the sequence of broadcast sources; determining that at least one condition has been satisfied; and presenting a next media stream from a next broadcast source in the sequence of broadcast sources, the next broadcast source being positioned after the first broadcast source in the sequence of broadcast sources.

The systems are described herein identifying and routing media streams based on geolocation information. The systems include one or more processors and a non-transitory computer-readable medium storing instructions that, when executed by the one or more processors, cause the one or more processors to perform any of the methods as previously described.

The non-transitory computer-readable media described herein may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
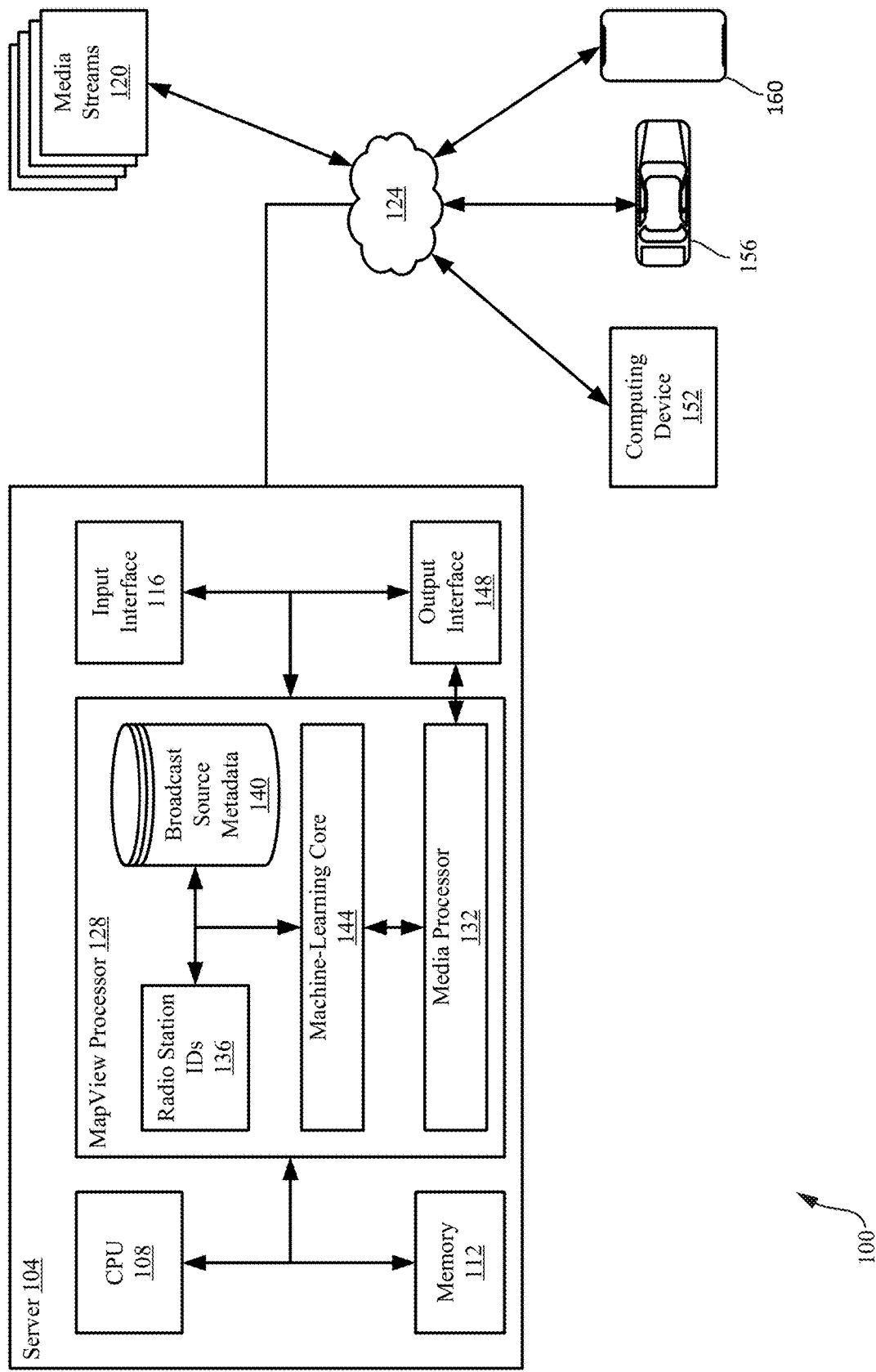
FIG. 1 is a block diagram of an example MapView system configured to identify and route media streams based on multi-layer geospatial data according to aspects of the present disclosure.

Methods and systems are provided herein for identifying and presenting media streams based on geospatial data. A MapView system may include one or more devices, systems, and/or software components that operate to provide geospatial data to users. In some examples, the MapView system may be executed by a computing device of a vehicle such as, but not limited to, an in-vehicle entertainment system or other computing device that provides operations of the vehicle. Alternatively, the MapView system may include one or more separate computing devices that operate within the vehicle (e.g., operating separately from, but potentially connected to, the in-vehicle entertainment system, etc.). In other examples, the MapView system may be executed by a mobile device, a stationary computing device (e.g., such as a desktop computer or the like), a thin client, a server, or any other processing device. The MapView system can be configured to receive sensor data and/or other data to present geospatial data to users of the MapView system.

The MapView system may present one or more interfaces (e.g., graphical user interfaces, etc.) configured to display geospatial data, other data of received or generated by the MapView system, receive data from one or more users or devices, present media streams (e.g., such as video and/or audio) from broadcast sources (e.g., such as, but not limited to radio stations, Internet radio, etc.). For example, the MapView system may be configured to display a representation of a geographical area (e.g., such as Earth, an extraterrestrial planet, a fictional locational, etc.). The representation may be a globe, map, or the like. The representation of the geographical area may include icons indicative of a broadcast source. The icons may include information associated with the broadcast source such as, but not limited to, a logo, a symbol, an identifier such as a name or other identifier, a description of media broadcast by the broadcast source, age of the broadcast source, etc.

Users may interact with the MapView system to modify the representation and/or geographical area. For example, users may interact with the MapView system to rotate the globe, zoom in, zoom out, select a new representation of the geographical area, select a different portion of the geographical area for display, select a new geographical area, and/or the like. The MapView system may receive input from an input/output device (e.g., keyboard, mouse, etc.), touchscreen, voice input (e.g., directly or by a digital assistant, etc.), hard keys (e.g., positioned on a steering wheel, another area of a vehicle, proximate to an interface of the MapView system, combinations thereof, and the like). For instance, input may be received to cause the representation of the geographical area to be focused over the eastern United States. Further input may be received to zoom in to New York City, at which point the representation may include a map of at least a portion of New York City.

The MapView system may generate one or more markers within the representation of the geographical area indicative of a current location of the MapView system within the graphical area. The MapView system may automatically update the current location using data received from one or more nearby computing devices or sensors. For example, if operating within an in-vehicle entertainment system, the MapView system may receive sensor data from sensors of other devices of the vehicle such as a global positioning system, speedometer, accelerometers, etc. In another example, the MapView system (operating in a vehicle or on another device) may receive sensor data from a mobile device in communication with the MapView system (e.g., via Bluetooth, Wi-Fi, etc.). Examples of data that may be received by the MapView system include, but is not limited to, a global positioning system location, speed, direction, acceleration, any other sensor data of a vehicle, any sensor data of a mobile device, and the like. Alternatively, or additionally, the MapView system may receive activity data indicative of a current activity of a user operating the MapView system to modify the representation of the geographical being displayed. Examples of activity data include, but is not limited to, stationary, walking, cycling, driving, flying, etc.

The representation of the geographical area may include one or more icons representing broadcast sources (e.g., radio stations, media broadcasting locations, etc.). The MapView system may use a location of the broadcast source to position the icon within the representation of the geographical area such that the icon is positioned at approximately a same location within the representation of the geographical area as the broadcast source is positioned within the geographical area. The MapView system may approximate the location of broadcast sources within non-Earth geographical locations. In some instances, the MapView may use a machine-learning model to determine locations for broadcast sources within non-Earth geographical areas. The MapView system may train the machine-learning model using images of portions of real-world geographical areas and an identification of a location of one or more broadcast sources within the portions of real-world. The MapView system may then pass an image or map of a hypothetical geographical area and the machine-learning model may predict the locations of broadcast sources within the hypothetical geographical area. The machine-learning model may generate locations for broadcast sources within extraterrestrial planets, fictional locations, or the like such that the broadcast sources are located at realistic locations. The machine-learning model may be, but is not limited to, neural network, perceptrons, decision trees, Naïve Base, a regression-based model (e.g., such as logistic, etc.), neural network, convolutional neural network, deep learning networks, support vector machines (SVM), Naïve Bayes, K-nearest neighbor, general adversarial networks, combinations thereof, or the like.

In some examples, a MapView system may include a database of identified broadcast sources. The database may include an identification of broadcast sources, an identification of one or more media streams broadcast by the broadcast source, an identification of a location of the media streams (e.g., global positioning system coordinates, latitude and longitude coordinates, address, etc.), an identification of a broadcast area over which a media stream broadcast from a broadcast source may be received via radio-frequency receiver, and/or the like.

A MapView system can identify particular media streams in diverse geolocations for presentation by a particular device. For example, the MapView system may identify broadcast sources through one or more communication channels (e.g., radio, Internet, etc.), and represent the broadcast sources as icons within the representation of the geographical area. The MapView system may filter the icons being displayed and/or the current portion of the geographical area being represented based on user input. For example, the MapView system may receive a set of constraints for use in identifying a set of media streams media streams and/or broadcast sources. Examples of constraints may include, but are not limited to, a genre, a song, an artist, an album, a media presentation (e.g., a concert, television show, movie, etc.), an identification of historical media streams (e.g., within a predetermined time interval such as past day, year, etc. or with any time interval), a broadcast source (e.g., radio station), a location (e.g., a country, a state, a region, a city, an address, etc., a context (e.g., such as a concept, emotion, an experience, and/or the like), or the like.

The MapView system may use the constraints to filter the current icons displayed within the representation of the geographical area and/or modify the representation of the geographical area. For example, the MapView system may display a first set of icons representing broadcast sources located within the geographical area in the representation of the geographical area. The first set of icons may include all broadcast sources in the geographical area or a portion of the broadcast sources based on properties of one or more users of the MapView system (e.g., based on broadcast sources historically selected by the one or more users, preferred genres of the one or more users, etc.). The MapView system may receive constraints that include an identification of a genre. The MapView system may generate a subset of the first set of icons that includes only those icons that represent broadcast sources broadcasting media streams tagged with the identified genre. In another example, the MapView system may receive constraints that includes an identification of a genre and a location. The MapView system may then modify the representation of the geographical area such that the representation is centered over the portion of the geographical area that includes the identified location. The MapView system may then display icons within the representation of the portion of the geographical area that correspond to broadcast sources broadcasting media streams tagged with the identified genre.

In some instances, the MapView system may execute one or more machine-learning models configured to predict one or more media streams that should be included in the set of media streams. The machine-learning models may be trained using training data received and/or derived from media streaming data associated with the current user such as, but not limited to, media streams previously presented by the MapView system. Alternatively, or additionally, training data may also be received and/or derived from historical data associated with the MapView system, information from devices associated with the current user (e.g., such as, but not limited to, information received and/or derived from other devices operated by the current user, devices operated by users associated with the current user (e.g., friends, family, social media contacts, device contacts, devices that previously presented media streams that satisfy one or more of the constraints, etc.), combinations thereof, or the like. Alternatively, or additionally, the machine-learning models may be trained using media streaming data associated other devices (e.g., such as devices similar to the MapView system, devices executing a MapView system or MapView application, devices executing a media streaming application, devices operated by users that are similar to the current user as determined by media stream history or location, etc.). The machine-learning models may be trained using supervised training, supervised training, semi-supervised training, reinforcement training, combinations thereof, or the like.

The machine-learning models may include any model configured to generate predictions based on historical data such as, but not limited to a classifier. Examples of such machine-learning models include, but are not limited to, perceptrons, decision trees, Naïve Base, a regression-based model (e.g., such as logistic, etc.), neural network, deep learning networks, support vector machines (SVM), Naïve Bayes, K-nearest neighbor, combinations thereof, or the like.

Once trained, the machine-learning models may be executed to generate the first set of icons such that only those broadcast sources predicted to be of interest to a current user of the MapView system may be presented. The machine-learning models may receive, as input, information associated with the current user (e.g., an identification of the current user, demographic information, a historical set of media streams or broadcast sources associated with the current user, etc.), a current location of the MapView system, an intended location of the MapView system, an identification of a geographical area combinations, thereof, or the like. Alternatively, or additionally, the machine-learning models may be executed using the constraints to predict the subset of the first set of icons.

In an illustrative example, a MapView system may be configured to identify and/or present media streams based on geolocation data of a particular device. The MapView system may receive a request to present media streams based on geolocation data associated with the particular device (e.g., a current location of the particular device, a location selected by the particular device, a virtual location, fictional location, etc.). The MapView system be executed by the particular device (e.g., as a hardware or software component of the particular device, etc.) or by a remote device (e.g., a server, etc.), or as a distributed process executing on one or more of computing devices, servers, mobile device, in-vehicle entertainment systems, cloud networks, and/or the like. The particular device may be a mobile device (e.g., such as a smartphone, tablet, personal digital assistant, or the like), a computing device (e.g., such as desktop or laptop computer, server, etc.), an in-vehicle entertainment system, or the like. The location may be determined by sensor input such as from a global positioning system, accelerometers, speedometers, and/or the like. In some instances, the location may be received from one or more other devices, derived from the position of one or more other devices, radio frequency triangulation (e.g., from Bluetooth, cellular, Wi-Fi, or the like), network characteristics (e.g., Internet Protocol address, etc.), and/or the like. The location may not be a current location of the particular device. For instances, the particular device may be an in-vehicle entertainment system in Washington, DC and the location may be the Caribbean Islands.

The MapView system may receive or select a presentation type that determines how the media streams are to be presented by the particular device. Examples of presentation types in include, but are not limited to, a stationary playlist, a tour, road trip, local, and/or the like. A stationary playlist may include a sequence of media streams or broadcast sources that switch based on predetermined criteria (e.g., such as time, scheduled programming, a location of a another device (e.g., such as device operated by another user, and/or the like).

A tour may be a simulated road trip through a virtual route. The MapView system may define a virtual route that includes a sequence of broadcast locations along the virtual route which the MapView system would be in broadcast range of (e.g., the MapView system would be within a predetermined distance of the broadcast source and be configured to receive the media stream of the broadcast source over a primary communication channel such as radio frequency communication) if the MapView system were to actually travel along the virtual route. The MapView system may synchronize the virtual route to a real route that the MapView system is traveling such that each unit length (e.g., kilometer, mile, etc.) traveled along the real route corresponds to virtually traveling a corresponding distance along the virtual route. The MapView system may automatically switch broadcast sources as the MapView system is within a broadcast range of a broadcast source along the virtual route. Alternatively, the MapView system may execute the tour while stationary in which broadcast sources may be switched in a sequence along the virtual route based on a time interval.

In an illustrative example, a navigation system of the particular device may receive a route of the approximately 570 miles between San Francisco, CA and Las Vegas, NV. The MapView system identify (or receive) a virtual route for the tour that is the approximately 524 miles from Paris, FR, and Munich, DE. For example, the MapView system may receive an identification of a location or region of interest to a user of the MapView system or identify routes based on having a similar distance to the real route, etc. The MapView system may identify a set of broadcast sources in including broadcast sources located in Paris, FR, Reims, FR, Metz, FR, Strasbourg, FR, Pforzheim, DE, Stuttgart, DE, Ulm, DE, Augsburg, DE, and Munich DE.

As the particular device moves from San Francisco to Las Vegas, the MapView system may cause the particular device to present a media streams from the corresponding location along the virtual route. When departing San Francisco, for example, the MapView system may present a media stream with a broadcast source in Paris, FR (e.g., the corresponding starting location). At roughly 50 miles into the real route between San Francisco and Las Vegas, the particular device would be approximately halfway between Paris and Reims along the virtual route and potentially within range to receive a media stream broadcast from Reims. The MapView system may then cause the particular device to switch to the next media stream in the set of media streams, which may be a media stream with a broadcast source in Reims.

The MapView system may define a distance ratio that is the ratio of the distance of the route to the distance of the virtual route (e.g., 570/524). The distance may be used to determine what a distance traveled along the real route is equal to along the virtual route. Returning to the previous example, each 1.08 miles traveled along the real route is equal to 1 mile along the virtual route. The MapView system may determine a distance interval, time interval, or location interval that may determine when to switch to a next broadcast source. The process may continue until the particular device reaches a destination of the tour (e.g., Las Vegas along the real route and Munich along the virtual route) or input is received terminating the tour.

In some instances, the particular device may present a tour type without traveling at all. For example, a tour type may be selected and the MapView system may define a virtual route and identify a set of media streams that broadcast from broadcast sources along the virtual route. The MapView system may then present the set if media streams in a simulated tour. The MapView system may switch from a first media stream to a next media stream in the set of media streams based on predetermined criteria such as at regular time intervals, when the media stream would be reached if traveling at predetermined average rate by a particular medium (e.g., on foot, by horse, by bicycle, by car, by train, by boat, by plain, etc.), a location of another device (e.g., following along someone route, or the like.

A road trip presentation type may be a presentation of local broadcast sources along a traveled route. The MapView system may receive a route from a navigation system, mobile device, user input, and/or the like, and a set of broadcast constraints (e.g., genre, type, popularity, location, signal strength corresponding to a size of an area capable of receiving the media stream of the broadcast source, broadcast schedule such as programs or sports to be broadcast, etc.). The MapView system may identify broadcast sources along the route that the MapView system may be in broadcast range of and that satisfy the set of broadcast constraints. As the MapView system travels long the route and is within broadcast range of a broadcast source that satisfies the set of broadcast constraints, the MapView system may automatically switch to the new broadcast source.

A local presentation type may be configured to identify hyper-local broadcast sources (e.g., broadcast sources that include local media and/or presentations). For example, a hyper-local broadcast source may include a broadcast source presenting a high school football game, local bands, and/or discussing local events. The local presentation type may cause the MapView system to automatically present a hyper-local broadcast source when positioned with broadcast range of one.

The MapView system may include user interfaces with a representation (e.g., a globe, map, etc.) of a particular geographical area (e.g., Earth or a region thereof, an extraterrestrial location, fictional location, etc.) with icons representing locations of broadcast sources. The user interface may be manipulated (e.g., rotated along any of three axes, zoomed in or out, and/or the like) so as to enable a visual identification of broadcast sources and/or media streams. The MapView system may receive user input via a touchscreen, input/output device (e.g., keyboard, mouse, etc.), voice commands, hard keys, mobile devices in communication with the MapView system, combinations thereof, or the like. When representing real locations (e.g., on Earth), the icons may be positioned within the representation of the geographic area so as to represent the actual location of the broadcast sources (e.g., the precise location on a map).

The MapView system may include additional user interfaces and/or user interface controls for identifying particular broadcast sources and/or media streams. The user interfaces may include a search element configured to accept user input of a query. The MapView system may execute the query and return a list of media streams and/or broadcast sources that satisfy the query. The user interface may include controls for searching within the list and/or filtering the list. For example, the query may include a location such as France and the MapView system may return a list of media streams and/or broadcast sources in France. The MapView system may include options to filter the list of media streams such as, for example, by genre, language, geographical area or sub-geographical area, media streams marked as favorite or preferential, current or upcoming media segments presented by a broadcast source, historical media streams accessed by the user, and/or the like. Alternatively, or additionally, one or more additional queries may be executed against the list of media streams.

In some examples, the user interface may present one or more icons each representing a location of a broadcast source on the map. The icon may be positioned at a location of the map that correspond to the physical location of the broadcast source. The user interface may be manipulated (e.g., via buttons, a touchscreen, etc.), to adjust the portion of the map that is being displayed, zooming in, zooming out, etc. In some instances, the quantity of icons presented may be limited to prevent displaying too many icons at single time. For example, the user interface may present 10 icons representing 10 broadcast sources. The quantity of icons presented may be selected based on the proximity of the icons on the map (e.g., reducing the quantity of icons when the icons are clustered together and expanding the quantity of icons when the icons are separated by a threshold amount), user input, and/or the like. If the quantity of broadcast sources located within a particular geographical area being presented by the user interface is greater than the quantity of icons, then a set of broadcast sources equal to the quantity of icons may be selected from the quantity of broadcast sources. The user interface may then present icons corresponding to the set of broadcast sources.

User input corresponding to a query or filtering criteria may be received and used to adjust the user interface. For example, filtering criteria corresponding to a particular genre (e.g., alternative, heavy metal, pop, news, sports, etc.) may be received causing the MapView system to remove icons representing broadcast sources associated with the selected genre. Alternatively, the filtering criteria may cause the MapView system to remove icons representing broadcast sources that are not associated with the selected genre.

FIG. 1 is a block diagram of an example system 100 configured to implement a MapView system that can identify, and route media streams based on multi-layer geospatial data according to aspects of the present disclosure. System 100 may include hardware and/or software components that operate within a distributed environment to provide a MapView system. The MapView system may include hardware and/or software components that may be included within a client-side device (e.g., within a computing device or user device configured to receive MapView-system services, media streams, etc. such as, but not limited to computing device 152, an in-vehicle entertainment system 156, a mobile device 160, or the like), a server-side device (e.g., such as server 104), or distributed between a client device and server. When operating in a distributed environment, the MapView system may include executable processes in which some processes may be executed by the user device and some processes may be executed by the server.

Server 104 may receive media streams 120 (e.g., such, but not limited to a radio broadcast) over network 124 (e.g., a cloud network, a local area network, a wide area network, the Internet, etc.). The media streams 120 may be transmitted by a broadcast source (e.g., physical location from which a media stream is broadcasted or transmitted such as, but not limited to, a radio station).

Server 104 may include processing hardware (e.g., one or more processors such as CPU 108, memory 112, input interfaces 116, output interfaces 148, etc.) and MapView processor 128. MapView processor 128 may include hardware components (e.g., media processor 132, other processors, memory, etc.) and/or software processes that execute to provide the functionality of MapView processor 128. MapView Processor 128 may include one or more database that include an identification of broadcast sources 136, broadcast source metadata 140 (e.g., identification of media streams broadcast by a broadcast source, a genre of the media streams, a program schedule of content included in the media streams, location of the broadcast source, etc.), and/or the like.

Machine-learning core 144 may include one or more machine-learning models trained to provide services to user devices (e.g., devices 152-160). The machine-learning models include models configured to predict broadcast sources or broadcast streams that may be of interest to a user or user device. Examples of such machine-learning models include, but are not limited to, perceptrons, decision trees, Naïve Base, a regression-based model (e.g., such as logistic, etc.), neural network, deep learning networks, support vector machines (SVM), Naïve Bayes, K-nearest neighbor, combinations thereof, or the like.

The machine-learning models may be trained using identification of broadcast sources 136, broadcast source metadata 140, historical broadcast sources and/or media streams presented by a particular device or group of devices, demographic information associated with the particular device or group of devices, location information (e.g., of particular device, the group of devices, the broadcast sources, etc.), combinations thereof, or the like. When using a group of devices, MapView processor 128 may identify devices to be included in a group based on one or more common properties (e.g., connected via social media, recently transmitted or received text messages with another device of the group, demographic attributes, etc.). The training data may be stored in memory of MapView processor 128, one or more external servers or databases, user devices, and/or the like. When a machine-learning model is to be trained, MapView processor 128 may request data stored in any remote device using input interface 116 and output interface 148. The request may manual or automatic (e.g., generated and executed using one or more application programming interfaces, etc.). The machine-learning models may be trained using supervised training, supervised training, semi-supervised training, reinforcement training, combinations thereof, or the like.

Once trained, the machine-learning models may be executed (e.g., by media processor 132, CPU 108, by a user device, another device, etc.) to generate predictions for a particular device. For instance, a user device such as computing device 152 may access services provided a MapView system. The user device may interact with the MapView system through a user interface to identify broadcast sources and media streams. The user interface may include a representation of an environment (e.g., a map, globe, city, etc.) with icons positioned at the representation of the physical location of one or more broadcast sources. For example, a map of San Francisco may be presented with an icon at 2601 Mariposa St. representing a location of a radio station. Computing device 152 may input constraints that cause machine-learning core 144 to predict broadcast source or media streams that are to be presented to computing device 152. Computing device 152 may receive an identification of the broadcast sources or media streams and select a broadcast source to initiate a presentation of a media stream broadcast from the broadcast source. Alternatively, user input may be received selecting an icon within the representation of the environment and a media stream associated with the broadcast source represented by the icon may be presented. Machine-learning core 144 may provide other services such as identifying media streams to be presented by a user device in real-time based on a geographical location of the user device and/or broadcast source of the media stream (e.g., as described in connection to FIG. 6 below), generating virtual media streaming virtual tours or sequences of broadcast sources (or media streams) that are to be presented by a user device (e.g., as described in FIG. 7 below), and/or the like.

Figure 2B:
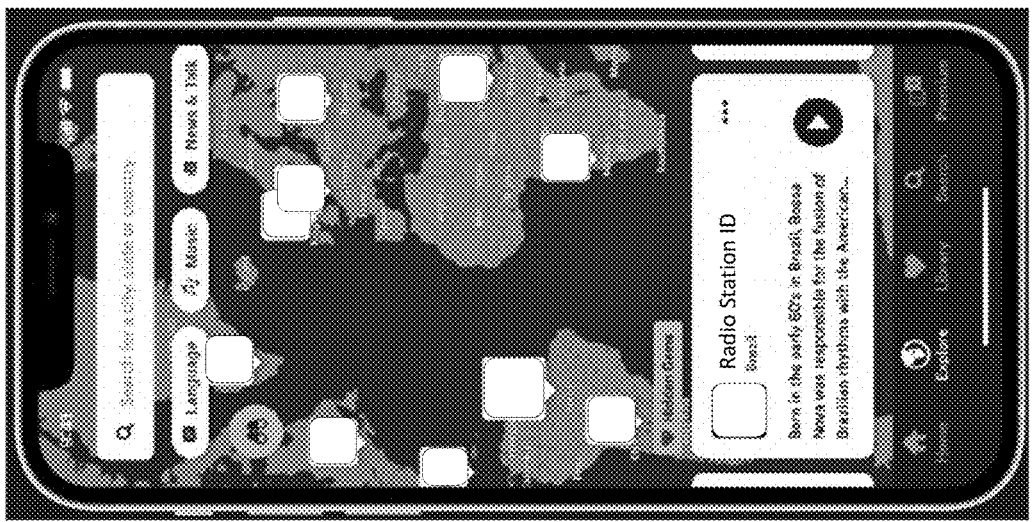
FIG. 2A-2F are example user interfaces illustrating various aspects of a MapView system according to aspects of the present disclosure.
Figure 2A:
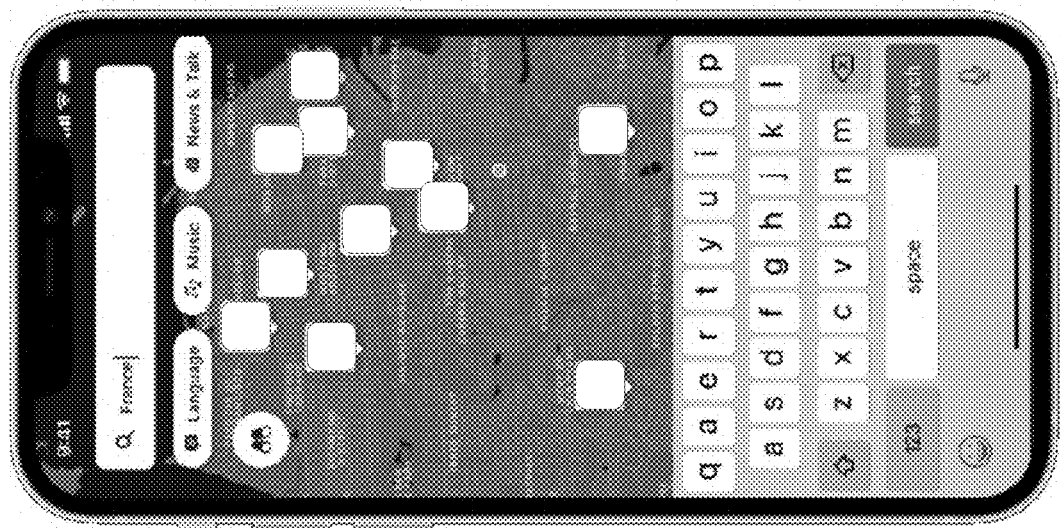

FIG. 2A-2F are example user interfaces illustrating various aspects of a MapView system according to aspects of the present disclosure. FIG. 2A illustrates an example MapView user interface in which a map of San Francisco is presented with icons representing broadcast sources. The icons are positioned over a representation of the physical location of the broadcast source represented by an icon. The user interface may be manipulated (using a touchscreen or other input device) to display a different portion of the map, zoom in, zoom out, etc. The user interface includes a search function (e.g., via a search bar), which may cause the user interface to display new maps. Examples of search criteria include, locations (e.g., such as "France" as shown), an identification of a broadcast source (e.g., such as KQED in San Francisco, etc.), an identification of a broadcast source, a genre, a program (e.g., such as a particular content segment of a media stream, a context or concept (e.g., such as science fiction, etc.), an emotion (e.g., such as calm music, etc.), combinations thereof, or the like. The search bar may accept Boolean operators and/or natural language input. The user interface may include filter icons that enabling filtering the quantity or type of icons on the user interface. The user interface may enable content-based filters (e.g., genre, broadcast source type, average listeners of a broadcast source, location of a broadcast source, language utilized by a broadcast source, program schedule, emotion, context or concept, content types, combinations thereof, or the like. For instance, the filters may be used to filter out radio stations that do not include local new content. Once a filter is activated, only those icons representing broadcast sources that satisfy the filter criteria may be presented with the user interface.

FIG. 2B illustrates another example MapView user interface. MapView user interfaces may present a representation of any location on Earth, of fictional locations (e.g., cities planets, etc.), and/or the like. As shown, the user interface includes icons for broadcast sources that are physically located within Africa, South America, the Caribbean, the United States, Europe, and Scandinavia. The user interface can be manipulated to zoom into a particular location (e.g., as shown in FIG. 2A). Selecting an icon may provide additional information about the broadcast source including, but not limited to, an identification of the broadcast source, a location of the broadcast source, a language of the broadcast source, an approximate distance of the broadcast source from the user device display the user interface, a description of the one or more media streams broadcast from the broadcast source, similar broadcast sources (e.g., near this broadcast source or anywhere else), combinations thereof, or the like. Selecting the icon may also enable presentation additional user interface controls such as an icon to initiate presentation of the media stream of the broadcast source, an icon to request or display additional information, etc. The additional information may include a history of the broadcast source, a history of properties of the broadcast source within the location (e.g., a history of Bossa Nova music in Brazil), an identification of other user devices presenting this broadcast source (e.g., such as those associated with this user device, devices that have similar demographic properties, etc.), and/or the like.

The user interface may include a hidden gems icon that may provide suggest media streams or broadcast sources to the user device. In some instances, one or more machine-learning models may execute to provide predictions. The machine-learning models (e.g., trained and/or utilized as previously described or described below) may be trained for a particular device (e.g., such as this user device), for groups of devices, or may usable for any device.

Figure 2D:
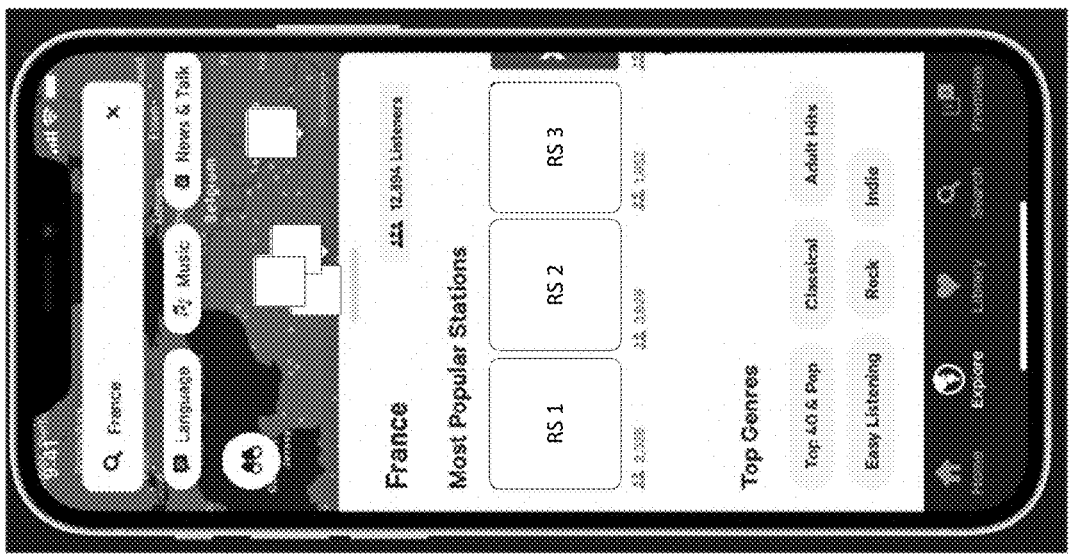
Figure 2C:
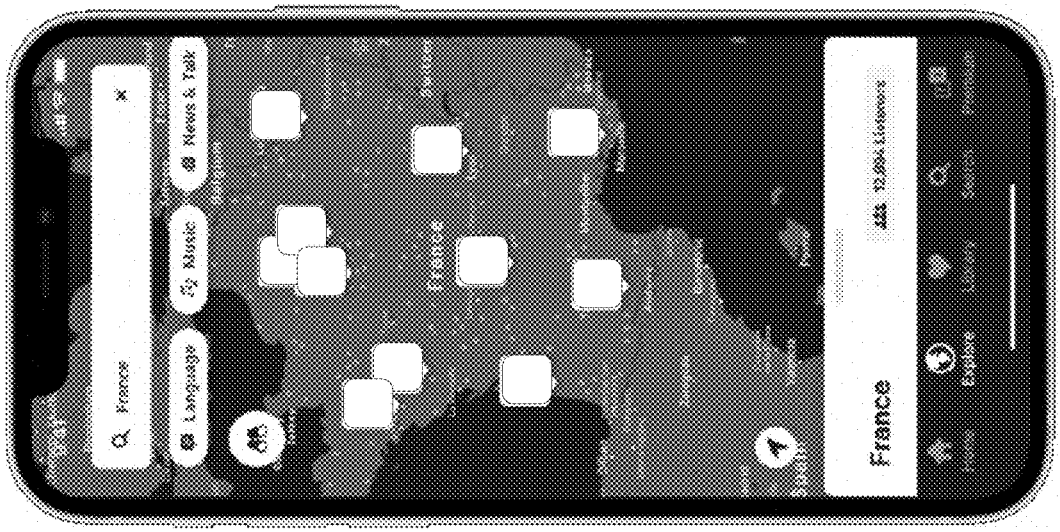

FIG. 2C illustrates an example MapView user interface of the country of France in response to a search query of "France". The user interface can include icons representing broadcast sources physically located within France. In some instances, large icons may represent broadcast sources that correspond to search or filter criteria. Broadcast sources that do not satisfy search or filter criteria may be represented differently (e.g., with a dot or other visual artifact positioned at a representation of the physical location of the broadcast source.

FIG. 2D illustrates an example MapView user interface when selecting a particular location (e.g., such as a continent, country, city, region, etc.). The MapView user interface includes additional interface upon selecting the particular location such as the most popular broadcast sources, top genres, quantity of users of MapView, etc.

Figure 2F:
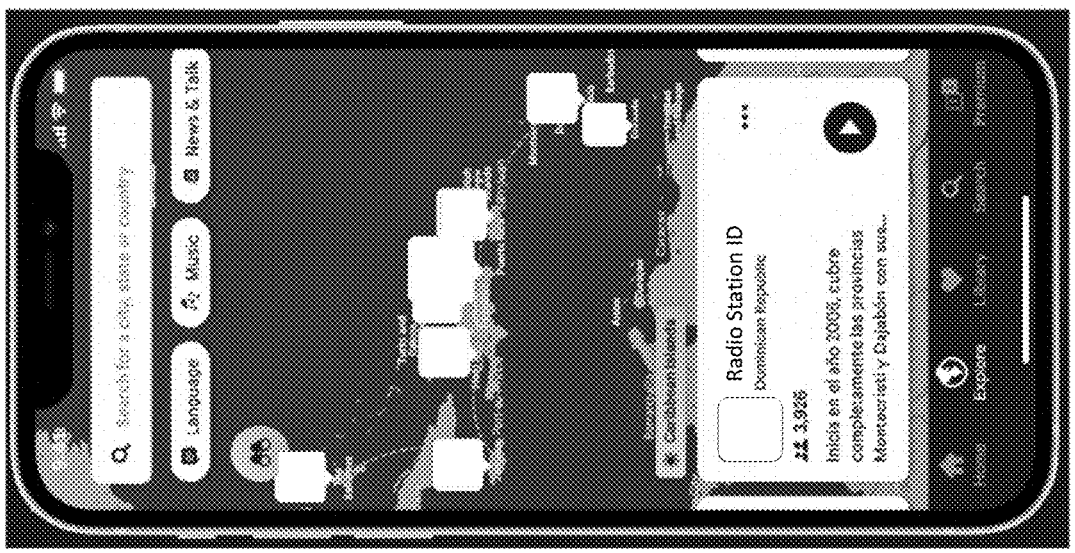
Figure 2E:
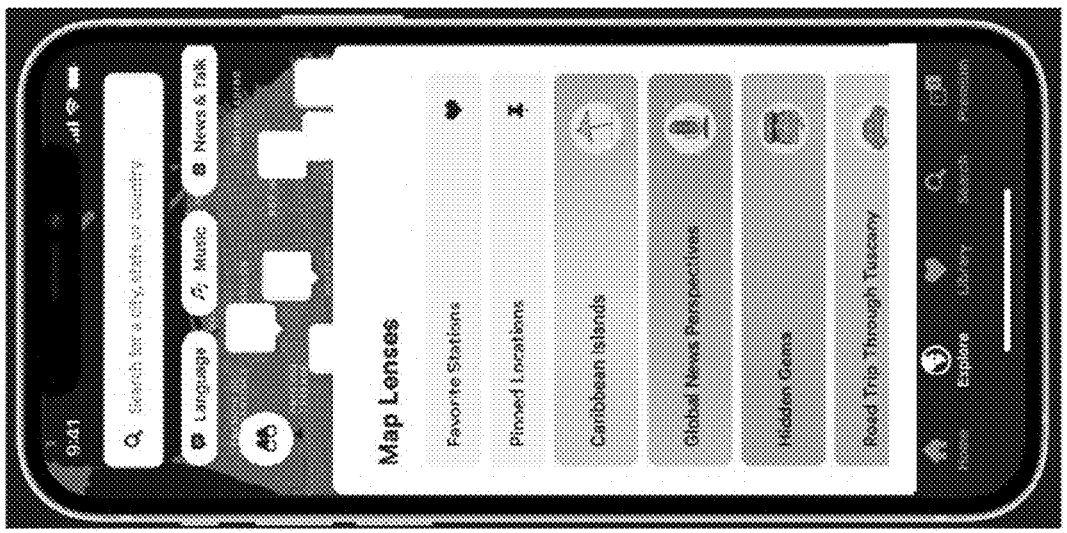

FIG. 2E illustrates an example MapView user interface utilizing Map Lenses that enable identification of new (to the user device) broadcast sources. The Map Lenses may be a component of a user interface that when activated provides an identification of broadcast sources marked as favorite, broadcast sources pinned for future listening, and controls for identifying new broadcast sources, based on genre, locality, etc. In some instances, Map Lenses may include icons that when selected establish particular experiences such as virtual tours (e.g., through Tuscany as shown, other real or fictional places, etc.).

For example, FIG. 2F illustrates an example MapView user interfaces presented upon selecting a virtual tour through the Caribbean Islands. The MapView system may define a virtual tour (as shown with the dotted line) and generates a sequence of broadcast sources that are physical located along the virtual route that could be presented by the user device if the user device was traveling along the route. Since the user device is also able to present the sequence of broadcast streams over a secondary communication channel (e.g., the Internet), the MapView system can simulate a route through the Caribbean Islands. The user device may progress through the route in real time (e.g., based on the distance of the route) broadcasting broadcast sources if the user device is positioned at a position along the virtual route that is within range of the broadcast source. The user device may switch to a next broadcast source when the user device is simulated as being at position of the virtual route within range of the next broadcast source. The user device may move along the route by moving an equivalent (or a proportion thereof) distance (not simulated) such as by driving a car on a road trip. Alternatively, the user device may switch to a next broadcast source upon one or more other conditions being satisfied such as a time interval or the like.

Figure 3B:
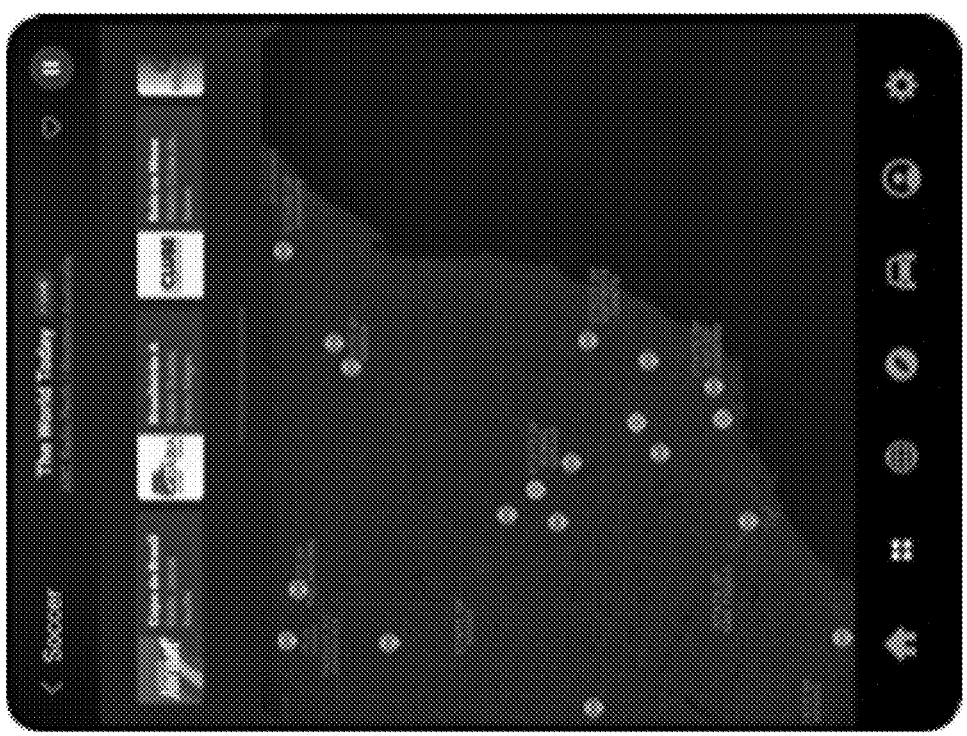
FIG. 3A-3B are example, alternative user interfaces illustrating various aspects of a MapView system according to aspects of the present disclosure.
Figure 3A:
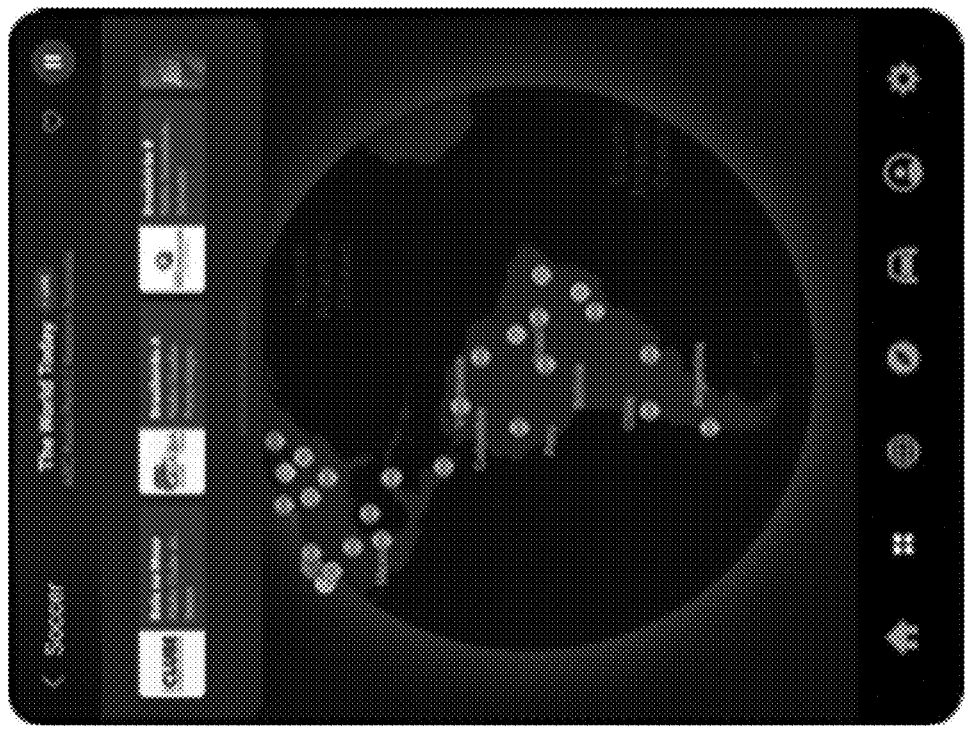

FIG. 3A-3B are example, alternative user interfaces illustrating various aspects of a MapView system according to aspects of the present disclosure. FIGS. 3A and 3B illustrate example MapView user interfaces that may be presented by a computing device or in-vehicle entertainment system. For instance, a user within a vehicle (e.g., as an operator or passenger) may access the MapView system to visually navigate a representation of the globe that includes icons representing broadcast sources (e.g., positioned at a representation of the physical location of the broadcast source. The user interface may include a search function to locate particular broadcast sources or types of broadcast sources (or media streams), filters to define what icons are displayed within the user interface, and/or the like. The user interface may include other icons for accessing other processes of the MapView system (e.g., such as those that utilize machine-learning models to predict broadcast sources, manage settings of the MapView system, identify new broadcast sources based on one or more criteria, or the like). The MapView user interface may be manipulated (using a touch screen interface or other input device) to move alter the environment that is presented, zoom in, zoom out, select a new environment to present, etc.

Figure 4:
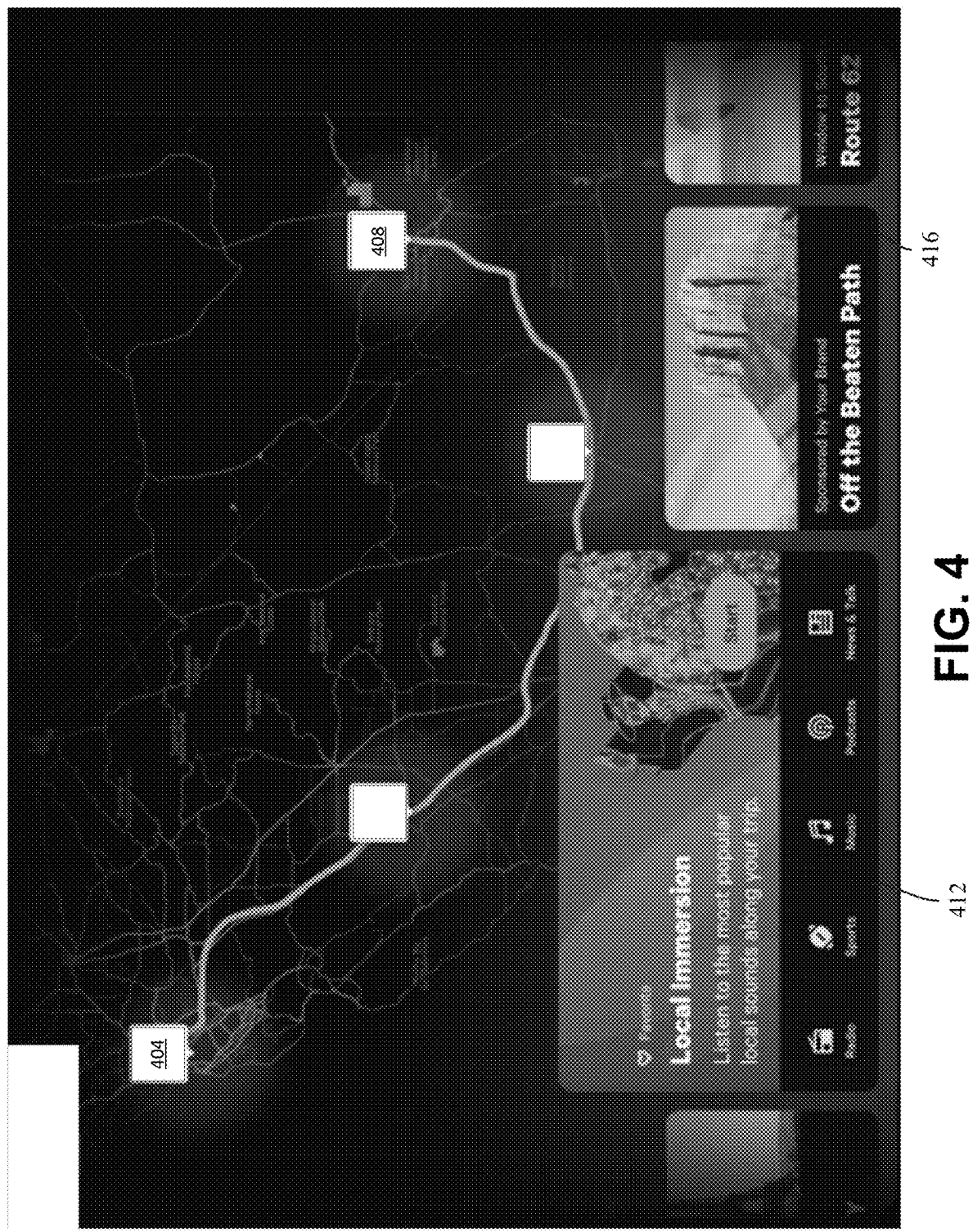
FIG. 4 is an example illustration of a MapView system identifying broadcast sources along a route according to aspects of the present disclosure.

FIG. 4 is an example illustration of a MapView system identifying broadcast sources along a route according to aspects of the present disclosure. The MapView system may receive route information from a component of the user device executing the MapView system (e.g., a mobile device, a in-vehicle entertainment system, a computing device, etc.). For example, the MapView system may receive a route from a navigation system of the in-vehicle entertainment system. The route information may include a starting location, a destination location, and an identification of the route to be traveled from the starting location to the destination location. For example, the route shown may have a starting location 404 of San Francisco and a destination location 408 of Las Vegas. The route information may correspond to a planned trip in which the user device or a user thereof is intended to travel. Alternatively, the route information may correspond to a virtual experience in which the MapView system may be used to simulate the route without traveling along the route.

The MapView system may identify broadcast sources along the route. The broadcast sources may include broadcast sources that the user device would be configured to receive when located within a predetermined distance from the broadcast source. For example, broadcast sources transmitting over a radio frequency channel may be received within a predetermined distance from the broadcast source. The MapView system may identify broadcast sources that may be received when traveling along the route. The MapView system may be configured to receive media streams over radio frequencies (e.g., a primary communication channel of some broadcast sources) and/or the Internet (e.g., a secondary communication channel of the broadcast sources). The MapView system may simulate presenting media streams over the primary communication channel even when the MapView system is configured to present media streams broadcasting over the secondary communication channel. For example the MapView system may terminate presentation of a media stream when the MapView system is positioned outside the predetermined distance from the broadcast source of the media stream or switch to a new media stream when the broadcast source of the new media stream when the MapView system is within the predetermined distance (or closer to) the broadcast source of the new media stream.

The MapView system may include user interfaces that include representations of the route, the current position of the MapView system along the route, notable places along the route, locations along the route in which a new media stream may be presented, notable media streams or broadcast sources along the route, landmarks, current and/or historical facts, combinations thereof, or the like. The user interface may include selectable objects that when selected enable identifying broadcast sources and/or media streams. The selectable objects include object 412 that identifies popular broadcast sources positioned along the route and object 416 that identifies broadcast sources that are off the beaten path (e.g., broadcast sources that broadcast over less populated geographical areas. Other selectable objects may also be shown that may identify broadcast sources that meet other criteria such as broadcast sources of a particular type or genre, program schedules, locations, average quantity of users consuming the media stream from a broadcast source, combinations thereof, or the like.

The user interfaces may include selectable objects that enable searching for broadcast sources, generating sequence of broadcast sources (e.g., a long the route, a virtual route, and/or the like), filtering currently displayed broadcast sources, etc. Broadcast sources can be searched by text, type, genre, popularity, etc. For example, selecting a genre may cause a list of broadcast sources that correspond to that genre to be displayed. The list may be filtered according other criteria (e.g., being positioned along a route, distance from the MapView system, popularity, type, location, etc.). The user interface may be configured to receive text input, voice input, and/or gesture input (e.g., a touchscreen interaction, etc.).

The selectable objects may include a selectable object that once selected provides information associated with a currently presented broadcast source, a previously presented broadcast source, a next broadcast source along the route, and/or the like. The information may include, but is not limited to, an identification of the broadcast source, an identification of media streams of the broadcast source, an information associated with the broadcast source, an age of the broadcast source, a location of the broadcast source, current or historic facts of the broadcast source, landmarks proximate to the broadcast source, information about the location of the broadcast source, combinations thereof, or the like.

The user interfaces may include configurable elements that upon selection may modify the look or feel of the user interface such as changing colors, zooming in, zooming out, changing the geographical location (e.g., by rotating or otherwise moving the viewable portion of the map, etc.), changing the geographical area (e.g., from Earth as shown to an extraterrestrial location geographical area, fictional geographical area, etc.), the quantity of broadcast sources to be displayed, the type of broadcast sources to be displayed, etc.

The MapView system may present user interfaces to enable selection of a route and/or a virtual route, a sequence of broadcast sources along the route, criteria for selecting broadcast sources, and/or the like. For example, a first route may be received by the MapView system. The MapView system may present an option to select a virtual route that corresponds to the route. The virtual route may be another location within a same geographical area as the MapView system (e.g., on Earth), an extraterrestrial location (e.g., Mars, Titan, etc.), a fictional location, or the like. The MapView system may receive input identifying the virtual route or receive input requesting the MapView system generate the virtual route based on one or more criteria (e.g., media stream preferences, location, language, etc.). The MapView system may present virtual routes that correspond to the one or more criteria (e.g., using machine-learning models as described herein). The virtual route may have a same distance, similar distance, or have a distance that is a multiple of the distance of the route. The MapView system may define a distance ratio that corresponds to the ratio of the distance of the route to the distance of the virtual route. In some instances, the MapView system may use a higher resolution ratio that captures movement within each of three-dimensional planes (e.g., x, y, and z dimensions, etc.) to capture changes in elevations in addition to distance.

The MapView system may then identify a sequence of broadcast sources for presentation along the route. If a virtual route is selected, the sequence of broadcast sources may include broadcast sources located along the virtual route such that the MapView system would be within broadcast range (e.g., the MapView system would be positioned within a predetermined distance from the broadcast source) of the broadcast sources if the MapView system was traveling along the virtual route. If a virtual route was not selected, the sequence of broadcast sources may include broadcast sources that the MapView system will be in broadcast range of, when traveling along the route. The sequence of broadcast sources may be selected based on one or more properties selected by the user (or predicted by the machine-learning model). For example, the one or more properties may include genre, popularity, type, location, age of the broadcast source, etc. In one illustrative example, user input selecting a local sports type may be received and the MapView system may generate a sequence of broadcast sources that include broadcast sources that broadcast local sports.

The MapView system may then define a switching type and a switching condition. The switching type indicates what criteria will be used to determine when to switch to a next broadcast source in the sequence of broadcast sources. The switching condition may include criteria that when satisfied causes the next broadcast source in the sequences to be presented. For example, a switch type may indicate "by distance", "by time", "by location", or the like and a condition may include a distance value that when traveled causes the MapView system to switch to a next broadcast sources, a time interval that when it terminates causes the MapView system to switch to a next broadcast sources, a location that when visited causes the MapView system to switch to a next broadcast sources, etc. In some instances, the MapView system may define the switch type and switch condition based on the route, virtual route, time interval expected to complete the route, traffic along the route, user input, combinations thereof, or the like. If the route or virtual route is not intended to be physically traveled, the switching type may be set to "by time" and the switching condition may be set default time interval, user set time interval, another time interval, etc.

As the user device travels along the route, the MapView system may present the broadcast streams of the sequence of broadcast streams. Each time the switching criteria and condition are satisfied, the MapView system may automatically switch to a next broadcast source in the sequence of broadcast sources. In some examples, the MapView system may receive input terminating presentation of a particular broadcast source. In those examples, the MapView system may switch back to presenting the immediately previous broadcast source or being presenting a subsequent broadcast source in the sequence.

Figure 5:
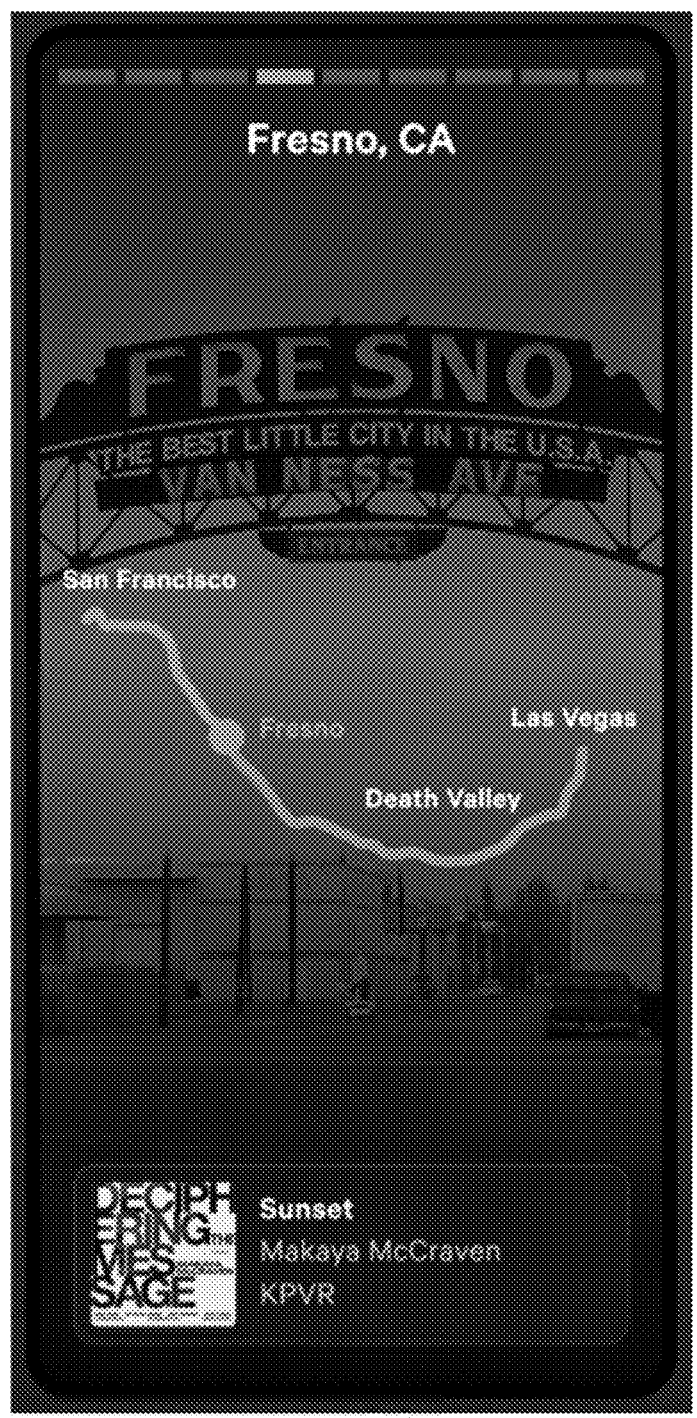
FIG. 5 is an example user interface depicting a summary a route or virtual route of a MapView system according to aspects of the present disclosure.

FIG. 5 is an example user interface depicting a summary a route or virtual route of a MapView system according to aspects of the present disclosure. The MapView system may generate a record of the route and/or virtual route as the user device is traveling. Upon reaching a destination location of the route, the MapView system may generate a summary of the route and/or virtual route. In some instances, the MapView system may present opportunities throughout the route for users of the MapView system to record memories of traveling the route and/or virtual route such as, but not limited to a prompt to take a picture (e.g., of the environment, of the users that consumed the media streams of the MapView system over the route, etc.), record an audio segment, and/or the like. Any user configured to interact with the MapView system along the route and/or virtual route may record memories (e.g., a driver of a vehicle, any of the passengers of the vehicle, remote users that presenting the sequence of broadcast sources along with those traveling the route, etc.). The MapView system may generate images and/or user interfaces that include representations of landmarks along the route or virtual route, a map representing the route and/or virtual route, representations of recorded memories, representations of media streams or broadcast sources presented along the route and/or virtual route, image obtained from camera of the vehicle that the MapView system is executing within, etc.

In some examples, the MapView system may generate a sequence of images with each image including (but not limited to), an identification of a location along the route and/or virtual route; a landmark, recorded memory, and/or image captured while near that location, a media stream or broadcast source of the sequence that was being presented at that location, an identification of users that present at that location, and/or the like. The MapView system may order the sequence based on an order in which each location was reached along the route or virtual route. The sequence of images may be transmitted to each user that consumed the sequence of media streams and/or broadcast sources, users designated by a user of the MapView system, to a social media platform, etc. The sequence of images may be stored by the MapView system and presented during later operation of the MapView system. The sequence of images may be selected to regenerate the sequence of broadcast sources and/or media streams (e.g., such as when the route is being traveled again, a return route, to relive the experience, etc.).

The user interface shown illustrates one such image of a sequence of images in which the route traveled through Fresno, CA. The user interface may include information about the route at the particular location including, but not limited to, an identification of the particular location along the route, an image captured while at the location, a representation of the location along the route with an indication of the portion of the route traveled when reaching the location, an identification of the broadcast source being presented when at the location, etc. If a recorded memory included an image at the location, then the image may be presented. If the recorded memory did not include an image then an image may generated by the MapView system (e.g., such as a stock image, default image representing the location, an image obtained from an remote source such as the Internet, or the like. In some instances, a user of the MapView system may add and/or modify images after the trip. In those instances, the MapView system may receive user generated or captured images after the user interfaces are generated. The MapView system modify the user interfaces to use the received image in place of those originally used. For example, a user may capture images with a mobile device separate from the MapView system during the route. If the mobile device transmits the images before reaching the destination location, then the images may be included in the user interfaces. If the mobile device does not transmit the images until after the destination location is reached, the MapView system may modify the user interfaces to incorporate the received images.

Figure 6:
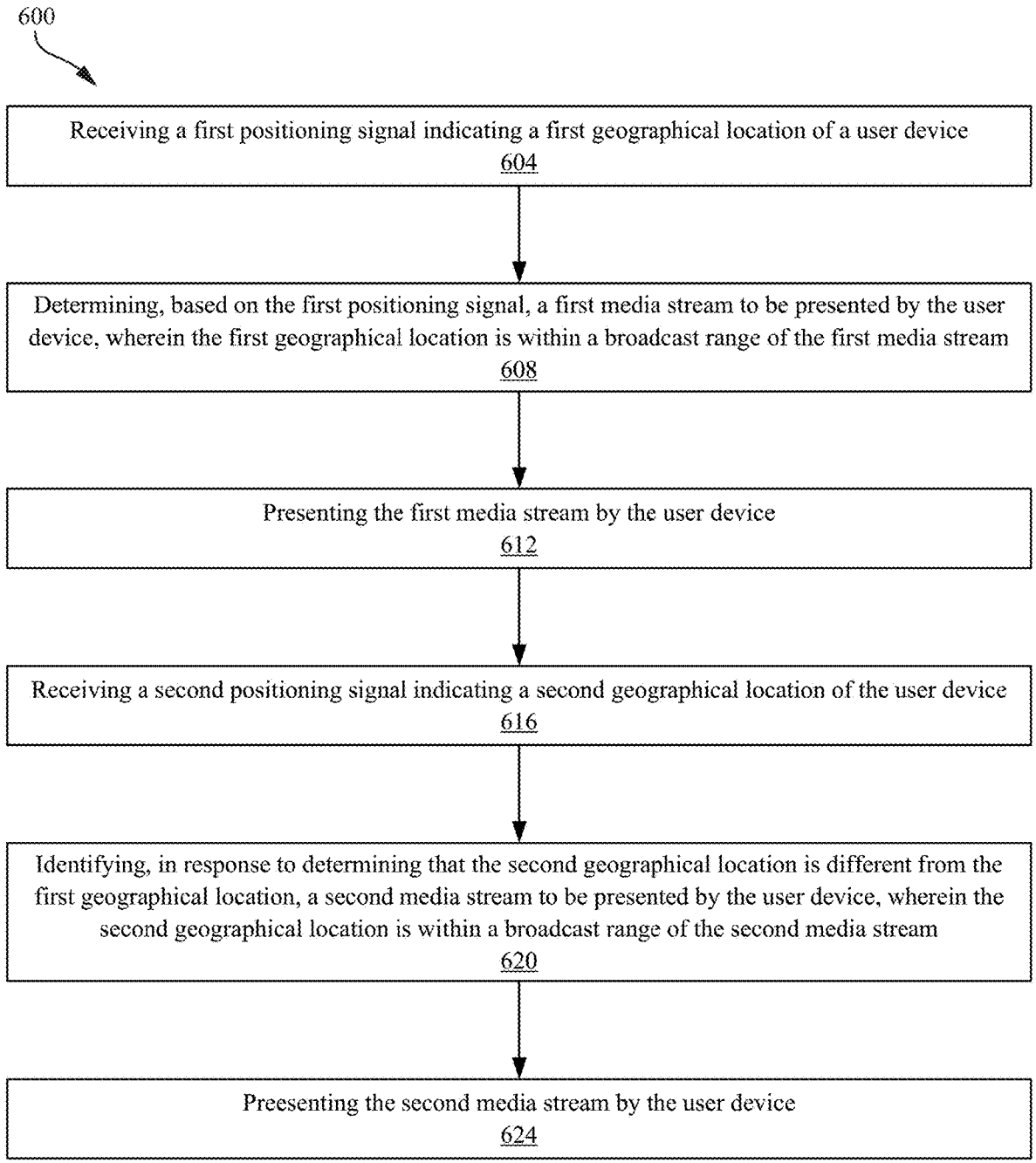
FIG. 6 is a flowchart of an example process for automatically routing media streams based on a real-time geolocation according to aspects of the present disclosure.

FIG. 6 is a flowchart of an example process for automatically routing media streams based on a real-time geolocation according to aspects of the present disclosure. At block 604, a MapView system may receive a first positioning signal indicating a first geographical location of a user device. The MapView system may be a software application executed by the user device and/or one or more other devices. The user device and/or the one or more other device may include, but not limited to, a computing devices (e.g., desktop/laptop computers, processing devices, etc.), a mobile device (e.g., such as a smartphone, personal digital assistant, etc.), in-vehicle entertainment system (e.g., one or more processing devices positioned within a vehicle and configured to present media through various hardware components of the vehicle such as, but not limited to, speakers, display devices, etc.), a server (e.g., in which a processing device or thin client is configured to interact with the MapView system remotely to identify media streams and/or broadcast sources and facilitate their presentation, etc.), in a distributed environment (e.g., in which functions of the MapView system are executed by one or more of the aforementioned user devices), or the like.

The first positioning signal may be received from a global positioning system, derived from one or more sensors (e.g., accelerometers, speedometers, etc.), derived from characteristics of a network connection (e.g., such as, but not limited to, an Internet Protocol address, an Media Access Control address, geofences, radio frequency triangulation, signal strength indication (RSSI) values, combinations thereof, or the like), combinations thereof, or the like. The global positioning system data, sensor data, and/or characteristics derived from the network connection may be received by the MapView system from a proximate device such as a mobile device in communication with the MapView system, components of a vehicle, components of the in-view entertainment system, other devices, etc. Alternatively, additionally, the global positioning system data, sensor data, and/or characteristics derived from the network connection may be received from components of the MapView system. For example, the MapView system may determine a relative position from a starting location (e.g., determined by a global positioning system signal, a predetermined location, user input location, radio-frequency triangulation (e.g., using cellular, Bluetooth, Wi-Fi, received signal strength indication (RSSI) values, combinations thereof, or the like) and continuously monitoring one or more sensors such as, but not limited to, accelerometers, speedometers, etc.

The geographic location may be a real location (e.g., a location of the user device on Earth), an extraterrestrial location (e.g., a location within an extraterrestrial geographical area such as Mars, Titan, a black hole, etc.), a fictional location (e.g., a location within an fictional geographical area such as from a book or movie, etc.). The MapView system may translate a real location of the user device to an extraterrestrial location and/or a fictional location and vice versa. The MapView system may use the translation to determine a virtual distance traveled by the user device within the extraterrestrial geographical area or fictional geographical area when the user device is moving from the real location. For example, the MapView system may define a distance ratio of a unit distance (e.g., a mile, a meter, kilometer, etc.) in each of three coordinate planes on Earth to a corresponding unit distance (e.g., a same distance unit or different) in each of three coordinate planes of the extraterrestrial and/or fictional geographical area. The MapView system may then determine when the first user device travels a predetermined distance on Earth, how far the first user device will virtually travel within the extraterrestrial and/or fictional geographical location.

At block 608, the MapView system may determine a first media stream to present to the user based on the first geographical location. In some instances, the first media stream may be a media stream broadcast over a primary communication channel (e.g., radio frequency communication such as, frequency modulation (FM), amplitude modulation (AM), or the like) or via a secondary communication channel, such as the Internet. The user device may be in broadcast range of the first media stream (e.g., the user device is positioned within a predetermined distance of the broadcast source and capable of receiving the first media stream over the primary communication channel of the broadcast source). For instance, a broadcast source (e.g., such as a radio station) may broadcast the media stream over a radio frequency with a predetermined power configured to be received over a first geographical region. As a result, the media stream may be received by devices tuned to the radio frequency that are positioned within the first geographical region (e.g., positioned within a particular distance from the broadcast source). The first geographical location may within the first geographical region. It should be noted, that the user device may receive the first media stream over the radio frequency over which the media stream is being broadcast by the broadcast source and/or over a secondary channel (e.g., such as the Internet, or the like) over which the broadcast source is also broadcasting the media stream.

At block 612, the MapView system may cause the user device to present the first media stream. The medium over which the first media stream is presented may be based on the user device. For instance, an in-vehicle entertainment system may present the first media stream via speakers and/or a display device of a vehicle, while a mobile device may present the first media stream via speakers and/or the display of the mobile device (e.g., depending on whether the media stream is audio, visual, or both).

At block 616, the MapView system may receive a second positioning signal indicating a second geographical location of the user device. In some instances, the second geographical location may be determined in a same manner as the first positioning signal. In other instances, the second geographical location may be determined in a different manner than the first positioning signal. The second positioning signal may be received from a global positioning system, derived from one or more sensors (e.g., accelerometers, speedometers, etc.), derived from characteristics of a network connection (e.g., such as, but not limited to, an Internet Protocol address, an Media Access Control address, geofences, radio frequency triangulation, signal strength indication (RSSI) values, combinations thereof, or the like), combinations thereof, or the like. The global positioning system data, sensor data, and/or characteristics derived from the network connection may be received by the MapView system from a proximate device such as a mobile device in communication with the MapView system, components of a vehicle, components of the in-view entertainment system, other devices, etc. Alternatively, additionally, the global positioning system data, sensor data, and/or characteristics derived from the network connection may be received from components of the MapView system. The second positioning signal may be received any time after the first positioning signal.

If the user device has not moved between receiving the first positioning signal and the second positioning signal, then the second geographical location may be a same geographical location. If the user device has moved between receiving the first positioning signal and the second positioning signal, then the second geographical location may be a different location within a same geographical area as the first geographical area. For example, the first positioning signal may indicate the user device is in Washington DC and the second positioning signal may indicate the user device is in Alexandria, Virginia. In some instances, the geographical area may be changed between receiving the first positioning signal and the second positioning signal. For example, the first geographical location may be a location on Earth and the second geographical location may be on an extraterrestrial geographical area such as Mars.

Since the media stream may be presented via a secondary communication channel (e.g., the Internet, etc.) the first media stream may continue to be presented even though the user device is positioned outside the predetermined region capable of receiving the first media stream when broadcast over the primary communication channel (e.g., radio frequency broadcast, etc.). Upon determining that the second geographical location is different from the first geographical location, the MapView system may determine if the user device is positioned within the first geographical region (e.g., and capable of continuing to receive the first media stream if received over the primary communication channel, etc.) or if the user device is now positioned within a different geographical region (e.g., where the user device is not within the predetermined distance from the broadcast source of the first media stream).

At block 620, the MapView system may identify, in response to determining that the second geographical location is positioned within a second geographical region that is different from the first geographical region, a second media stream to be presented by the user device. The user device may be in broadcast range of the second media stream. The second media stream may be associated with the first media stream based on one or more criteria. For example, the second media stream may be of a same type, genre, language, within a same country, popularity, combinations thereof, or the like. In some examples, the MapView system may use data associated with the user device to identify the second media stream such as, but not limited to, a user profile of a user of the user device, user preferences, user input, metadata, historical media streams presented by the user device, historical media streams requested by the user device, data associated with a user of the first device, combinations thereof, or the like. Additionally, or alternatively, the MapView system may use one or more machine-learning models to identify the second media stream (e.g., as previously described). The second media stream may be a media stream that is broadcast from a broadcast source that is physically located within the second geographical region.

For example, a user may be operating a MapView system while traveling from Washington, DC to New York City, NY. While located in DC, the MapView system may identify a media stream from a local broadcast source (e.g., a media stream capable of being received by devices in the Washington, DC area. As the user device travels towards New York City and is too far away to receive media streams from Washington, DC (e.g., over the primary communication channel of the broadcast source), the MapView system may identify media stream from an analogous, local broadcast source that the user device is current capable of receive (e.g., over the primary communication channel of the analogous, local broadcast source) and cause the media stream being presented to switch to the new media stream. This enable the MapView system to present local media streams as the user device travels to new locations while preserving the type of media stream being presented (e.g., a same genre, type, etc.).

At block 624, the MapView system may cause the user device to present the second media stream. The second media stream may be received by the user device over a primary communication channel of the second media stream (e.g., radio-frequency transmission) or a secondary communication channel (e.g., direct communications, the Internet, etc.).

Though the determination as to when to switch media streams is based on the ability to receive the media stream over a primary communication channel, the MapView system may determine whether to present the media stream over the primary communication channel or the secondary communication channel (e.g., the Internet). Accordingly, the MapView system may switch from the first media stream to the second media stream even though the MapView system can continue to present the first media stream (e.g., as Internet-based media streaming can be maintained from any location even those well outside the predetermined distance from the broadcast source). The MapView system may switch between presenting media streams over the primary communication channel and the secondary communications channel based on ability to receive the media stream over a respective communication channel, signal quality, signal strength, distance from the broadcast source, combinations thereof, or the like.

The MapView system may transmit a notification to a user of the user device that includes an identification of the second media stream, an identification of the broadcast source of the second media stream, information associated with the second media stream or its broadcast source (e.g., such a broadcast schedule, time over which the media stream has been broadcast, a description of the second media stream and/or its broadcast source, etc.), combinations thereof, or the like. The MapView system may receive input from the user accepting the second media stream causing the second media stream to be presented, denying presentation of the second media stream in which the first media stream may continue to be presented, selecting a different second media stream causing the different second media stream to be presented, or the like. Alternatively, the MapView system may automatically (e.g., without user intervention) switch to the presenting the new media stream.

Figure 7:
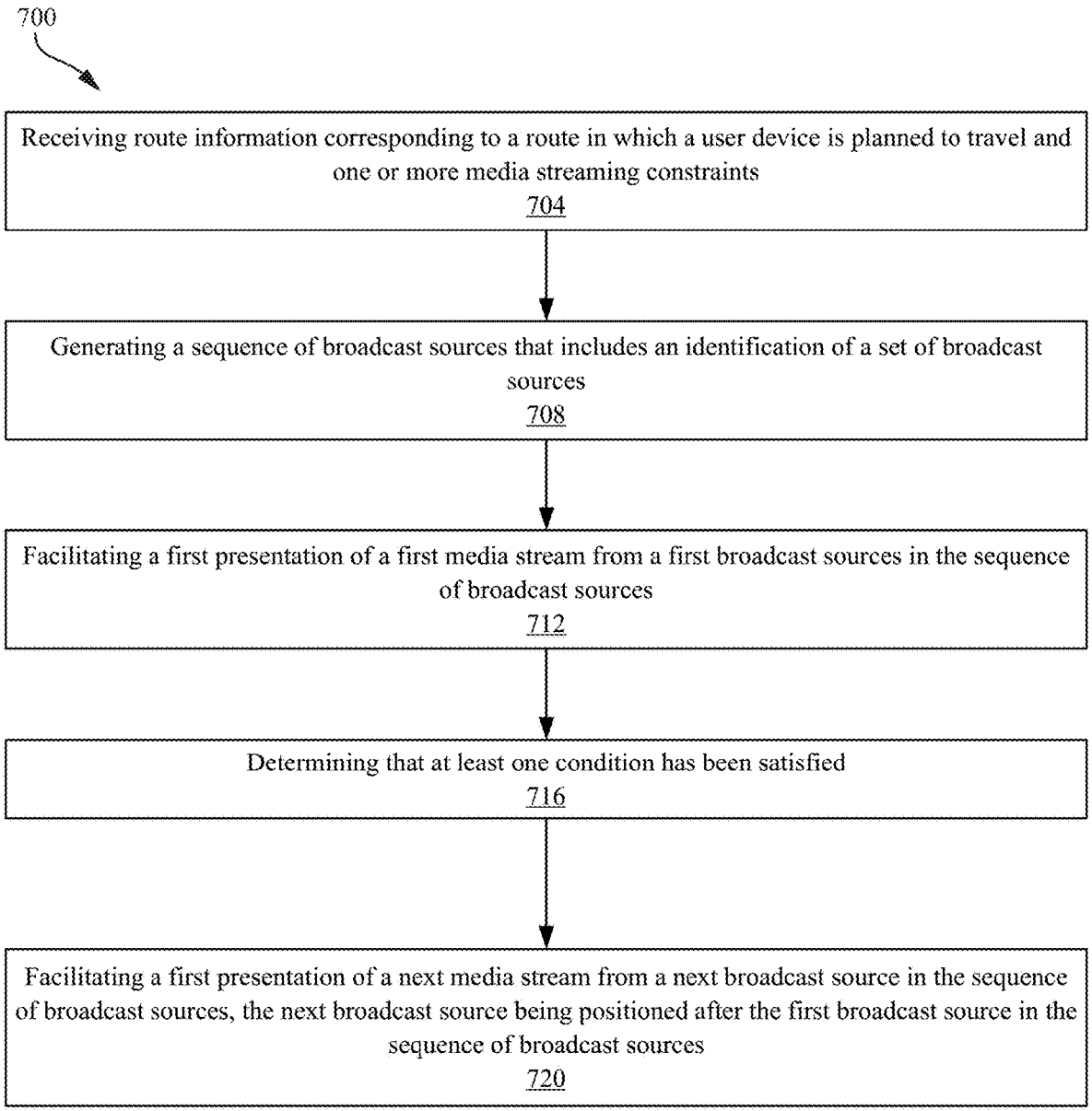
FIG. 7 is a flowchart of an example process for identifying sets of media streams based on geospatial data and presenting the media streams according to a real-time geolocation according to aspects of the present disclosure.

FIG. 7 is a flowchart of an example process for identifying sets of media streams based on geospatial data and presenting the media streams according to a real-time geolocation according to aspects of the present disclosure. At block 704, a MapView system receives route information corresponding to a route in which a user device is planned to travel and one or more media streaming constraints. The MapView system may be a software application executed by the user device and/or one or more other devices. The user device and/or the one or more other device may include, but not limited to, a computing devices (e.g., desktop/laptop computers, processing devices, etc.), a mobile device (e.g., such as a smartphone, personal digital assistant, etc.), in-vehicle entertainment system (e.g., one or more processing devices positioned within a vehicle and configured to present media through various hardware components of the vehicle such as, but not limited to, speakers, display devices, etc.), a server (e.g., in which a processing device or thin client is configured to interact with the MapView system remotely to identify media streams and/or broadcast sources and facilitate their presentation, etc.), in a distributed environment (e.g., in which functions of the MapView system are executed by one or more of the aforementioned user devices), or the like.

In some examples, the route may be received (or defined) by a navigation component of the user device. For example, input that includes a destination location (e.g., remote from a starting location) may be receiving by a navigation component of the user device. The navigation component may derive a route based on the starting location and the destination location and transmit the route to the MapView system (e.g., using an application programming interface exposed by the MapView system and accessible by the navigation component of the user device. Alternatively, the route may be received by the user device. For example, a mobile device (or other processing device) in communication with the MapView system (e.g., over cellular, Wi-Fi, Bluetooth, or the like) may derive the route and transmit the route to the MapView system. Alternatively still, the route may be defined by a user or predefined (e.g., already present within the MapView system).

The constraints may be usable by the MapView system to identify media streams that may be presented by the MapView system and/or the user device. The constraints may be associated with media streams (e.g., such as a genre of the media stream, type of media stream, average quantity of users consuming the media stream, location of users consuming the media stream, and/or the like), geographical location (e.g., a real location on Earth, an extraterrestrial location, a fictional location, or the like), a context or concept (e.g., such as a book, movie, emotion, or the like), information associated with the user device (e.g., current or previous locations of the user device, device type, connection types, user profile associated with the user device or a user thereof, users associated with the user profile or a user of the user device, etc.), combinations thereof, or the like.

At block 708, the MapView system may generate a sequence of broadcast sources (e.g., radio stations, a location from which a media stream is being transmitted, etc.). Alternatively, the MapView system may generate a sequence of media streams. The sequence may include an identification of each media stream or broadcast source, information associated with each media stream or broadcast source, a location of each broadcast source, an average quantity of user devices consuming the each media stream or broadcast sources, a current quantity of user devices consuming each media stream or broadcast sources, switching characteristic (e.g., indicating a criteria such as time or distance which is to determine when a next media stream or broadcast source is to be presented, etc.), switching condition (e.g., which when satisfied causes the media stream to switch to the next media stream in the sequence such as for example a particular distance or time interval), combinations thereof, or the like. The sequence of broadcast sources (or media streams) may be generated based on the constraints such that the broadcast sources may each have one or more common properties (e.g., location, genre, etc.).

In some instances, the sequence of broadcast sources (or media streams) may be generated based on information associated with the user device (e.g., historical media streams presented by the user device, a user profile of a user of the user device, metadata, demographical information of a user of the user device, users associated with the user of the user device, historical media streams presented by similar users to the user of the user device, and/or the like.). The MapView system may use one or more machine-learning models (e.g., as previously described) to generate the sequence of broadcast sources (or media streams). For example, the one or more machine-learning models may execute using the route, the constraints, and/or the information associated with the user device to identify broadcast sources and/or media streams to presented by the user device. The machine-learning models may identify broadcast sources and/or media streams that are likely to be of interest to a user of the user device.

In some instances, the sequence of broadcast sources (or media streams) may be generated based on a virtual route defined based on the constraints and/or the route. The virtual route may be of a same distance as the route, a distance that is a multiple of the distance of the route, a distance determined by user input, a distance determined based on the constraints, a distance determined based on a quantity of broadcast sources or media streams to be included in the sequence, and/or the like. In some examples, the MapView system may identify broadcast sources physically located proximate to the virtual route such that a device configured to receive transmissions from the broadcast source (or media stream) would be able to receive those transmission if positioned at a point along the virtual route proximate to the broadcast source. The sequence of broadcast source may be ordered in an order in which the broadcast sources (or media streams) are positioned along the virtual route.

In instances in which the virtual route is over a fictional location (e.g., a route from a book or movie, a fiction location, etc.), the MapView system may identify broadcast sources (or media streams) based on the constraints and/or the information associated with the user device. For example, the MapView system may define a virtual route based on the route Frodo traveled in the Lord of the Rings books. The MapView system may then identify a set of broadcast sources or media streams that may be contextually associated with the virtual route (e.g., broadcast sources associated with or that broadcast media streams associated with fantasy fiction talk shows, fantasy fiction movie scores or music, etc.). The MapView system may then order the identified broadcast sources (or media streams) into a sequence. In some instances, the MapView system may order the broadcast sources (or media streams) based on one or more factors (e.g., such as a broadcast sources relevance to a particular location along the virtual route, etc.). The MapView system may generate a name for the sequence of broadcast sources (or media streams) that is contextually related to the virtual route based on, for example, user input, a reference from the fictional location, a machine-learning model trained using lexicographical information from the fictional location, etc.

The MapView system may translate a real location of the user device to a location along the virtual route. The MapView system may use the translation to determine a virtual distance traveled by the user device along the virtual route. In some examples, the MapView system may define a distance ratio to determine a translation between the route virtual route. The distance ratio may be derived by the ratio of the distance of the route to the distance of the virtual. In other examples, the MapView system may factor in the changes in elevation when determining the distance ratio. In those examples, the distance ratio may be based on a ratio from a first unit of length (e.g., a mile, a meter, kilometer, etc.) in each of three coordinate planes of the route to a corresponding unit of length (e.g., a same distance unit or different) in each of three coordinate planes of the virtual route. The MapView system may then determine when the user device travels a predetermined distance along the route, how far the user device will virtually travel along the virtual route.

The MapView system may add to the constraints based on information generated or received when generating the sequence of broadcast sources. Examples of constraints that may be added include, but are not limited to: information associated with the virtual route (e.g., landmarks, current or historic facts, cultural information, wildlife information, information on association between the media stream and the virtual location, if a fictional route then information associated with the work from which the route was derived, combinations thereof, or the like). information associated with the sequence of broadcast sources (e.g., location, genre, broadcast type, broadcast region, etc.), information associated with the location of the virtual route, combinations thereof, or the like.

At block 712, the MapView system may cause the user device to present (e.g., via speakers, a display, etc.) a media stream from a first broadcast source in the sequence of broadcast sources. Alternatively, the MapView system may cause the user device to present a first media stream in the sequence of media streams.

At block 716, the MapView system may determine that at least one condition has been satisfied. For example, the MapView system may determine if the user device has moved a greater than predetermined distance along the route, if a predetermined time interval has lapsed, if a particular broadcast source or media stream such as the next broadcast source or media stream in the sequence is within a predetermined range of the user device to receive, etc.).

At block 720, the MapView system may present a next media stream from a next broadcast source in the sequence in response to determining that at least one condition has been satisfied. The next broadcast source may be positioned after the first broadcast source in the sequence of broadcast sources. In some instances, the MapView system may present an alternate broadcast source or media stream (e.g., another broadcast source in the sequence or a broadcast source that is not identified in the sequence) based on one or more properties of the next broadcast source or media stream in the sequence. For instance, if the next broadcast source includes alternative programming (e.g., content that does not conform to the content of the other broadcast sources or media streams, constraints, user preferences, etc.) or includes interference preventing the media stream from being presented at a threshold quality, the MapView system may identify an analogous broadcast source or media stream from a same or different location as the next broadcast source to present in place of the next broadcast source or media stream.

In some examples, the virtual route may be a tour around the world. The MapView system may extrapolate from the route an average direction of travel from the starting location to the destination location. The MapView system may then extend route along the average direction of travel until reaching the starting location once more (e.g., circumnavigating the geographical area). The MapView system may then identify a sequence of broadcast sources along the route (e.g., from the starting location to the destination location) and the virtual route (e.g., from the destination location to the starting location, where the route plus the virtual route circumnavigate the geographical area). The sequence of broadcast sources may be selected based on one or more characteristics such as, but not limited to, user input, a common genre, a common type, a minimum popularity, a minimum or maximum signal strength (e.g., indicavit of a size of a geographical area that can receive the media from the broadcast source, a language, a country, an age of the broadcast source, a broadcast schedule, combinations thereof, or the like.

The MapView system may receive (e.g., from user input) or define a switching type and a switching condition. In some instances, the switching type and/or condition may be defined such that each broadcast source of the set of broadcast sources may be presented for a least a predetermined time interval. The MapView system may then being presenting the first broadcast source in the sequence of broadcast sources. The MapView system may determine each time the condition is satisfied and switch to a next broadcast source in the sequence. In some instances, the switching type and condition may cause defined to cause broadcast sources to switch in regular intervals (e.g., every x kilometers traveled along the route, every x minutes, etc.). Alternatively, if the switching type is based on location, the MapView system may be configured to switch broadcast streams in the sequence of broadcast streams based on being with broadcast range of the next broadcast source. Since circumnavigating the geographical area may include locations that are too distant from broadcast sources, the MapView system may continue to present a broadcast source until the MapView system is within broadcast range of a next broadcast source (e.g., which may be longer for some broadcast sources than for others) to prevent not having a broadcast source to present.

The route plus the virtual route enable the MapView system to present an around the world tour of broadcast source. The around-the-world tour may be presented in the direction of trave (as previously described) or may be defined in any particular direction (e.g., around the equator, such that the route crosses the North pole, etc.). The broadcast sources may be switched according to time or distance (according to the switching type) and/or according to one or more other criteria (e.g., such as media being presented by a current broadcast source, media being presented by a next broadcast source, time of day, time of year, etc.).

The MapView system may generate a record of the route and/or virtual route as the user device is traveling. Upon reaching a destination location of the route, the MapView system may generate a summary of the route and/or virtual route. In some instances, the MapView system may present opportunities throughout the route for users of the MapView system to record memories of traveling the route and/or virtual route such as, but not limited to a prompt to take a picture (e.g., of the environment, of the users that consumed the media streams of the MapView system over the route, etc.), record an audio segment, and/or the like. Any user configured to interact with the MapView system along the route and/or virtual route may record memories (e.g., a driver of a vehicle, any of the passengers of the vehicle, remote users that presenting the sequence of broadcast sources along with those traveling the route, etc.). The MapView system may generate images and/or user interfaces that include representations of landmarks along the route or virtual route, a map representing the route and/or virtual route, representations of recorded memories, representations of media streams or broadcast sources presented along the route and/or virtual route, image obtained from camera of the vehicle that the MapView system is executing within, etc.

In some examples, the MapView system may generate a summary including a sequence of images with each image including (but not limited to), an identification of a location along the route and/or virtual route; a landmark, recorded memory, and/or image captured while near that location, a media stream or broadcast source of the sequence that was being presented at that location, an identification of users that present at that location, and/or the like. The MapView system may order the sequence based on an order in which each location was reached along the route or virtual route. The sequence of images may be transmitted to each user that consumed the sequence of media streams and/or broadcast sources, users designated by a user of the MapView system, to a social media platform, etc. The sequence of images may be stored by the MapView system and presented during later operation of the MapView system. The sequence of images may be selected to regenerate the sequence of broadcast sources and/or media streams (e.g., such as when the route is being traveled again, a return route, to relive the experience, etc.).

Figure 8:
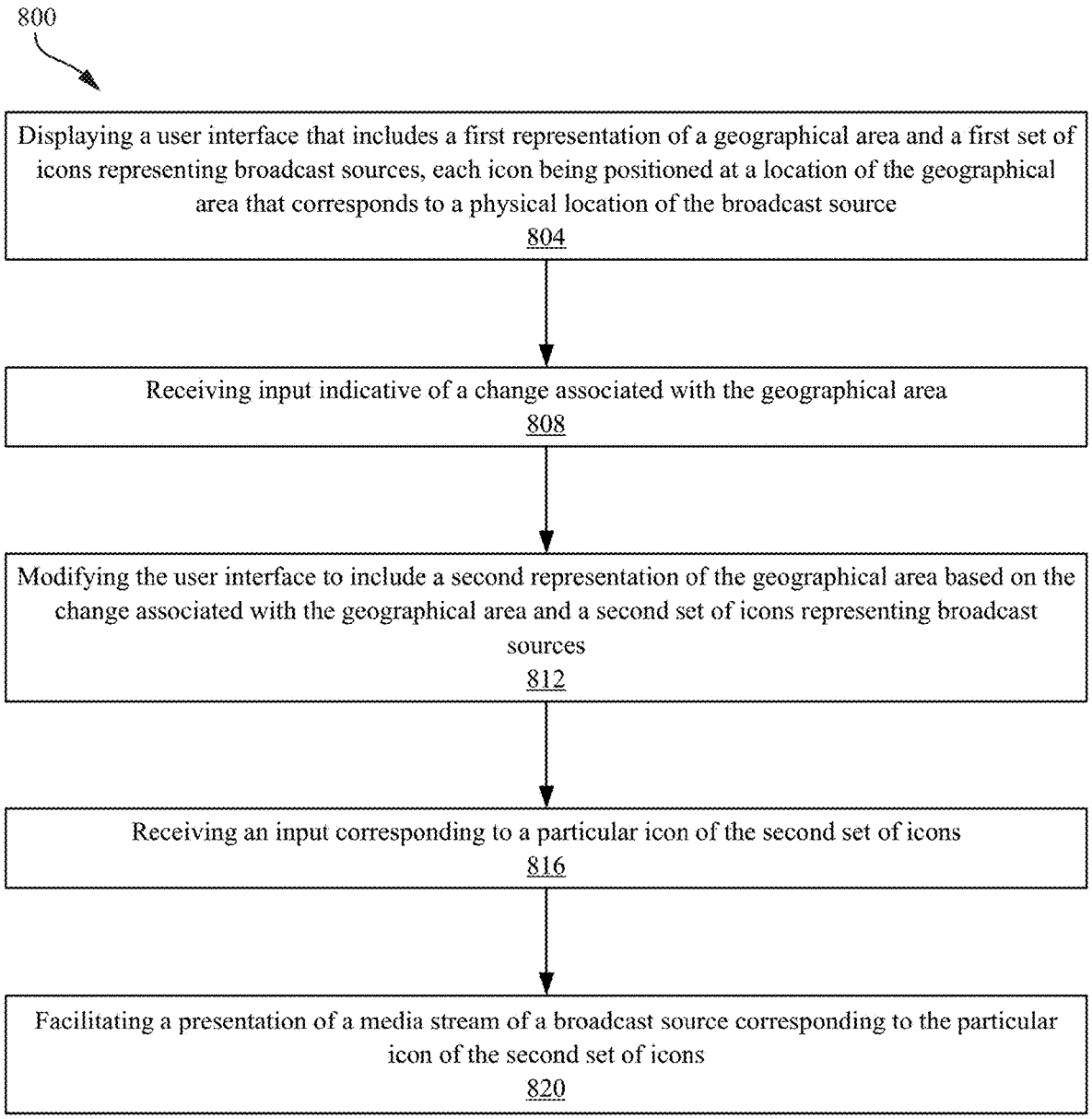
FIG. 8 is a flowchart of an example process for geospatial identification and presentation of media streams according to a real-time geolocation according to aspects of the present disclosure.

FIG. 8 is a flowchart of an example process for geospatial identification and presentation of media streams according to a real-time geolocation according to aspects of the present disclosure. Media device can be provisioned to present media streams from various broadcast sources. The media device may be a mobile device (e.g., such as a smartphone, tablet, etc.), computing device (e.g., such as a desktop computer, server, etc.), an in-vehicle entertainment system, specialized electronic device (e.g., such as a field-programmable gate array, application-specific integrated circuit, etc.), and/or the like. The media device may be configured to receive media from broadcast sources over one or more communication channels (e.g., radio, the Internet, local memory, nearby devices via a wired or wireless connection, etc.). The media device may execute various processes configured to identify broadcast sources and/or media streams for presentation by the media device.

At block 804, the media device may display a user interface that includes a first representation of a geographical area. The geographical area may be, but is not limited to, the Earth; another planet; a location from a fictional work such as from a film, television show, book, other works of fiction; or any other location real or fictional. In some instances, the geographical area may be a representation of a real location during a particular time interval (e.g., such as the Earth Mesozoic era of the Earth, etc.). The first representation of the geographic area may be a portion of the geographic area configured for display by the user interface. The portion of the geographic area may correspond to a contextually relevant location (e.g., to the media device, the user operating the media device, media being presented by the media device, combinations thereof, or the like) such as, but not limited to, a current or historical location of the media device, a home address of a user, a location in which a current media stream is being broadcast from, a location in which a preferred media stream broadcasts from, a last location that was in view during a previous instance in which the user interface was presented, user input, characteristics of a user operating the media device, a current location of the media device, or the like. In some instances, the portion of the geographical area that is displayed by the user interface may be randomly selected (e.g., using a random number generator, or the like) or selected based on characteristics of the user (and/or a user profile). For example, the user profile may include language preferences of the user. The first representation of the geographical area may display an area of the geographical area in which a language of the language preferences is spoken.

The user interface may include a first set of icons representing broadcast sources that are broadcasting media streams. When the geographical area corresponds to a real location, each icon of the first set of icons may be positioned within the first representation of the geographical area at a location of the geographical area that corresponds to the physical location of the broadcast source. A large quantity of broadcast sources may be physical located within the geographical area. The media device may limit the quantity of icons to be included in the first set of icons to make it easier to distinguish between icons. The media device may define a quantity of icons that can be displayed by the first representation of the geographical area (e.g., based on characteristics of the broadcast sources, user preferences, user input, how close the broadcast sources are to each other, etc.). If there are more broadcast sources than the permitted quantity of icons, then the media device may select from the broadcast sources those broadcast sources to be displayed (as an icon). In some examples, the media device may select broadcast sources based one or more parameters that include, but are not limited to, user preferences (e.g., genre, language, sports teams, location, etc.), historical broadcast sources accessed by the user, broadcast sources marked as 'Favorite' or 'Preferred', user input, a random number generator, combinations thereof, or the like. For example, the media device may generate a hierarchy of broadcast sources that are physical located within the geographical area based on any of the aforementioned parameters. The media device may then select from the hierarchy the broadcast sources based on the higher-ranking broadcast sources in the hierarchy.

An icon may indicate a particular location of a broadcast source within the geographical area using a pointer, pin, speech bubble, arrow, or other graphical depiction. The icon may also include a graphical representation of the broadcast source, a media stream being broadcast by the broadcast source, a particular song or program currently being presented by the media steam. The graphical representation may include, but is not limited to, a logo, album cover art of a song or program being presented, an image or representation of an artist of a song or program being presented, etc. The graphical representation may change over time such as each time a new song is being presented by a media stream, etc.

At block 808, the media device may receive input indicative of a change associated with the geographical area. The input may be used to manipulate the first representation of the geographical area and/or information associated with the geographical area such as, but not limited to, an identification of broadcast sources, an identification of media streams, an identification of landmarks, an identification of locations of interest, user preferences, user selected locations, and/or the like. The input may be received from the user (e.g., via a physical control such as a button, dial, etc.; touchscreen gesture; a voice command, a communication such as a text message or notification; combinations thereof; the like), from a sensor associated with the media device (e.g., an accelerometer, gyroscope, magnetometer, clock, global positioning system (GPS), and/or the like), combinations thereof, or the like. Input received from sensors associated with the media device may be receive in real time, in batches, in regular intervals, and/or the like.

For example, the media device may receive touchscreen input from the user that corresponds to a request to zoom-out of the portion of the geographical area represented by the first representation of the geographical area (e.g., using pinching motion on the touchscreen or other predefined zoom-out motion), zoom-in to the portion of the geographical area represented by the first representation of the geographical area (e.g., using a reverse pinching motion on the touchscreen or other predefined zoom-in motion), moving the portion of the geographical area to be represented (e.g., using a swiping motion on the touchscreen in the direction in which the first representation of the geographical area is to be moved or other predefined moving motion), rotating the first representation of the geographical area (e.g., using a swiping motion on the touchscreen relative to a fixed point of the touchscreen, or other predefined rotation motion), etc. Other user input may be received to cause other types of changes to the first representation of the geographical area.

In some examples, the input may include a change to the quantity or type of information presented within the first representation of the geographical area. For example, the input may correspond to a query, filtering criteria, combinations thereof, or the like. A query may be executed to identify particular broadcast sources, a media streams, landmarks, locations of interest, user selected locations (e.g., such as locations marked by a user, a home city, a home state, a home country, a home address, and/or the like) and/or the like that may be located within the first representation of the geographical area. Filtering criteria may be used to remove one or more pieces of information (e.g., identification of broadcast sources, an identification of media streams, an identification of landmarks, an identification of locations of interest, user selected locations, and/or the like) within the first representation of the geographical area. For example, filtering criteria may be received selecting a particular genre to cause the media device to remove icons representing broadcast sources (or media streams) that do not correspond to the particular genre.

In some examples, the input may correspond to a selection of a different geographical area. The geographical area may correspond to the Earth, another planet, a location from a fictional work (e.g., such as from a film, television show, book, other works of fiction, and/or the like), the Earth as it appeared during a particular time period or era, or the like. The input may change the geographical area from a first geographical are (e.g., Earth, etc.) to another geographical area (e.g., mars, etc.). When using a non-Earth geographical area, the media device may select locations within the representation of the geographical area that correspond to broadcast sources. The locations may be approximately the same as the real-world locations of the broadcast sources (e.g., relative to other broadcast sources to be placed in the representation of the geographical area) or may be selected according to other factors (e.g., based on characteristics of the broadcast sources, characteristics of the user, characteristics of the geographical area, user input, etc.).

In some examples, the input may include sensor measurements configured to modify the portion of the geographical area that is represented and/or the orientation of the portion of the geographical area that is represented. The media device may include one or more sensors usable to control an appearance of the geographical area. Alternatively, or additionally, the media device may receive sensor data from one or more nearby devices. For example, the media device may be a component of an in-vehicle entertainment system that can receive GPS data from a navigation component of the vehicle. The first representation of the geographical area may be centered over a current location of the media device within the geographical area. Alternatively, the first representation of the geographical area may be centered over a virtual location of the media device within the geographical area (e.g., such as when the geographical area is non-Earth based, when the virtual location corresponds to a particular location on Earth other than the current location of the media device, etc.). The input may correspond to measurements from the one or more sensors indicating a change in the location of the media device within the geographical area. The input may be used by the media device to adjust the representation of the geographical area so that the representation of the geographical area remains centered over the location of the media device within the geographical area. The media device may adjust the representation of the geographical area based on movement of the media device, changes in direction of the media device, changes in elevation of the media device, changes in an orientation of the media device (e.g., pitch, yaw, and/or roll, etc.), combinations thereof, or the like.

The media device may simultaneously receive input from both the user and from the one or more sensors associated with the media device.

At block 812, the media device may modify the user interface to include a second representation of the geographical area based on the change associated with the geographical area and a second set of icons representing broadcast sources. The second representation of the geographical area may correspond to the first representation of the geographical area modified according to the change associated with the geographical area. If the input included a selection of a new geographical area, then the second representation of the geographical area may correspond to a representation of the new geographical area.

The second set of icons may represent broadcast sources that are same as or different from the first set of icons. In some instances, the second set of icons represents a subset of the first set of icons. For example, if the input corresponds to a zoom-in command, then a smaller portion of the geographical area may be represented by the second representation. The second set of icons may include those icons of the first set of icons that are still located within the geographical area represented in the second representation of the geographical area.

Alternatively, the media device may maintain a quantity if icons presented within the representation of the geographical area. The second set of icons may represent broadcast sources located within the geographical area represented within the second representation of the geographical area. In some instances, the media device may first select those icons of the first set of icons having a location that is within the second representation of the geographical area. If the quantity of selected icons is less than the quantity to be included in the second representation of the geographical area, then the media device may generate one or more new icons representing broadcast sources that are within the second representation of the geographical area and that correspond to one or more selection criteria (e.g., a genre, a language, historical broadcast sources access by the user, user input, user preferences, etc.).

At block 816, the media device may receive input corresponding to a particular icon of the second set of icons. The input may be received from a user (e.g., using a button, touchscreen, voice command, etc.), from one or more sensors of the media device, and/or from the media device. For example, sensor measurements indicating that the media device is in motion may cause the media device to select a first icon of the second set of icons corresponding to a broadcast source broadcasting the user's preferred musical genre on a highway. Sensor measurements indicating that the media device is stopped or is in stop-and-go traffic may cause the media device to select a second icon of the second set of icons corresponding to a broadcast source broadcasting the user's preferred musical genre while in traffic.

In some instances, the input may be generated by the media device so as to enable automatic selection of the particular icon. For example, the input may be generated based on a machine-learning model configured to process information associated with the user to predict an icon (or broadcast source, media stream, genre, program, song, artist, etc.) that the user may enjoy. The media device may receive the prediction as the input. The machine-learning model may include any model configured to generate predictions based on historical data such as, but not limited to a classifier. Examples of such machine-learning models include, but are not limited to, perceptrons, decision trees, Naïve Base, a regression-based model (e.g., such as logistic, etc.), neural network, deep learning networks, support vector machines (SVM), Naïve Bayes, K-nearest neighbor, combinations thereof, or the like.

The machine-learning model may be trained using training data received and/or derived from information associated with the user such as, but not limited to, demographic information, user profile information, user preferences, characteristics of the user, characteristics of other users similar to this user (e.g., as determined by demographic information, listening history, listening preferences, location, etc.), media streams previously presented by the media device, media streams previously presented to similar users to this user, information received and/or derived from other devices operated by the current user such devices in communication with the media device, devices operated by users associated with the current user (e.g., friends, family, social media contacts, device contacts, devices that previously presented media streams that satisfy one or more of the constraints, etc.), combinations thereof, or the like.

Alternatively, or additionally, the machine-learning models may be trained using media streaming data associated other devices (e.g., such as devices similar to the media device, devices executing a MapView system or MapView application, devices executing a media streaming application, etc.). The machine-learning model may be trained using supervised training, supervised training, semi-supervised training, reinforcement training, combinations thereof, or the like.

Once trained, the media device may define a feature vector from features extracted from information associated with the user, the first set of icons and features extracted from the second representation of the geographical area (and/or features extracted from information associated with the user, the second set of icons, and features extracted from the first representation of the geographical area). The feature vector may be passed as input into the trained machine-learning model. Machine-learning model may be executed using the feature vector to generate one or more icon predictions corresponding to the second set of icons. Each prediction may include a confidence value indicative of a degree in which the prediction fits the input feature vector and/or information associated with the user. The media device may then select as the input, the prediction having a highest confidence value.

In some instances, the machine-learning model may be configured to predict the first set of icons and/or the second set of icons. In those instances, the media device may predict the first set of icons by generating a feature vector including features extracted from information associated with the user and features extracted from the second representation of the geographical area. The machine-learning model may then generate a predicted first set of icons that correspond to broadcast sources that may be of interest to the user. The media device may predict the second set of icons by generating a feature vector including features extracted from information associated with the user, the first set of icons, and features extracted from the second representation of the geographical area. The machine-learning model may then generate a predicted second set of icons that correspond to broadcast sources that may be of interest to the user. The first set of icons and/or the second set of icons may be modified based on user input and/or other information associated with the user such as, but not limited to, broadcast sources designated as favorite, broadcast sources designated as not to be shown, broadcast sources currently broadcasting media designated as not to be presented (or not liked by the user), etc.

At block 820, the media device may facilitate presentation of a media stream being broadcast by a broadcast source corresponding to the particular icon. In some instances, the media device may not include speakers or other means for presenting media. In those instances, the media device may facilitate presentation of the media stream by connecting to the media stream, decoding the media stream, and passing the decoded media stream to a media receiver configured to present the media stream (e.g., such as speakers, headphones, a television, a display device, etc.). In other instances, the media device may include components configured to present the media stream. In those instances, the media device may facilitate presentation of the media stream by connecting to the media stream, decoding media stream, and presenting the media stream using a component of the media device (e.g., based on the type of media of the media stream).

Figure 9:
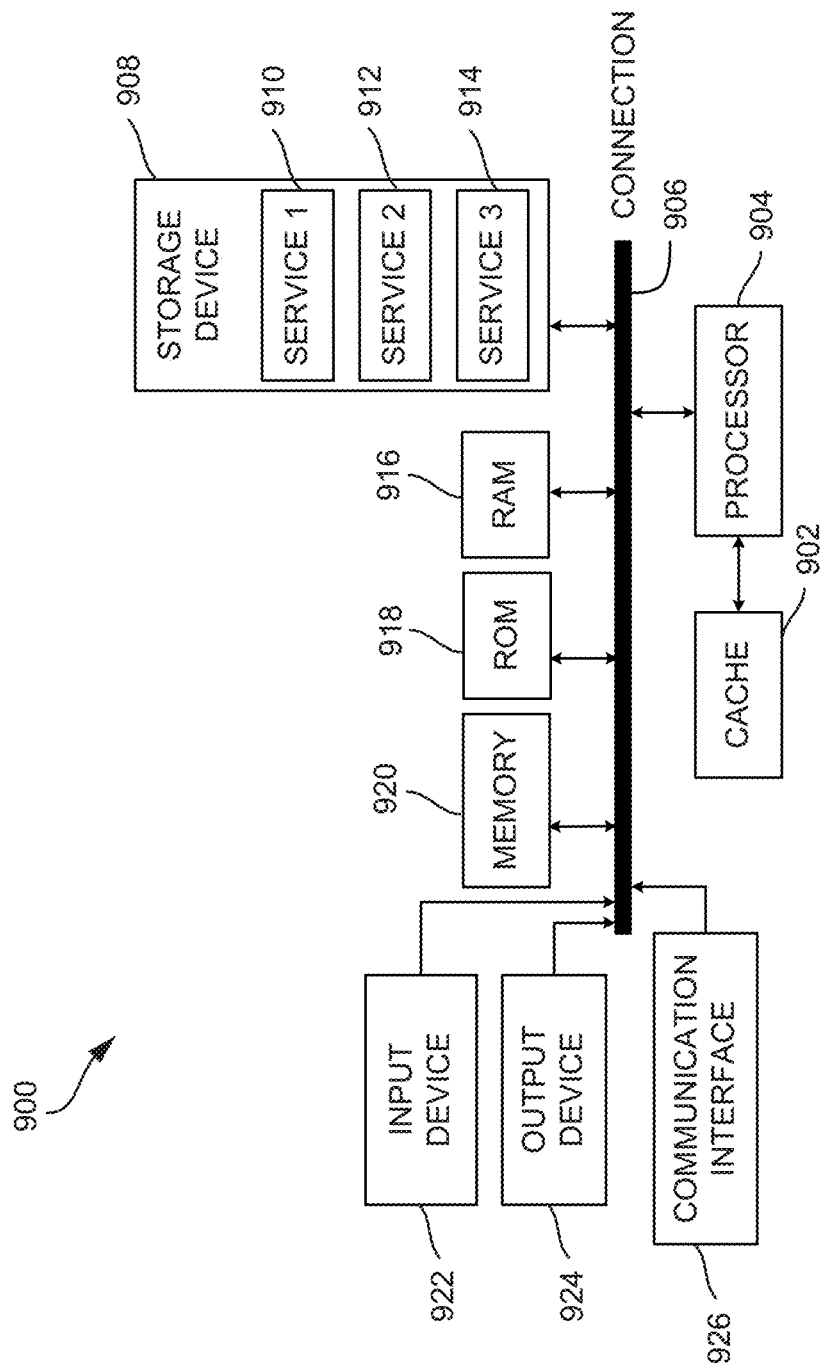
FIG. 9 illustrates an example computing device architecture of an example computing device that can implement the various techniques described herein according to aspects of the present disclosure.

FIG. 9 illustrates an example computing device according to aspects of the present disclosure. For example, computing device 900 can implement any of the systems or methods described herein. In some instances, computing device 900 may be a component of or included within a media device. The components of computing device 900 are shown in electrical communication with each other using connection 906, such as a bus. The example computing device architecture includes a processor (e.g., CPU, processor, or the like) 904 and connection 906 (e.g., such as a bus, or the like) that is configured to couple components of computing device 900 such as, but not limited to, memory 920, read only memory (ROM) 918, random access memory (RAM) 916, and/or storage device 908, to processing unit 910.

Computing device 900 can include a cache 902 of high-speed memory connected directly with, in close proximity to, or integrated within processor 904. Computing device 900 can copy data from memory 920 and/or storage device 908 to cache 902 for quicker access by processor 904. In this way, cache 902 may provide a performance boost that avoids delays while processor 904 waits for data. Alternatively, processor 904 may access data directly from memory 920, ROM 917, RAM 916, and/or storage device 908. Memory 920 can include multiple types of homogenous or heterogeneous memory (e.g., such as, but not limited to, magnetic, optical, solid-state, etc.).

Storage device 908 may include one or more non-transitory computer-readable media such as volatile and/or non-volatile memories. A non-transitory computer-readable medium can store instructions and/or data accessible by computing device 900. Non-transitory computer-readable media can include, but is not limited to magnetic cassettes, hard-disk drives (HDD), flash memory, solid state memory devices, digital versatile disks, cartridges, compact discs, random access memories (RAMs) 925, read only memory (ROM) 920, combinations thereof, or the like.

Storage device 908, may store one or more services, such as service 1 910, service 2 912, and service 3 914, that are executable by processor 904 and/or other electronic hardware. The one or more services include instructions executable by processor 904 to: perform operations such as any of the techniques, steps, processes, blocks, and/or operations described herein; control the operations of a device in communication with computing device 900; control the operations of processing unit 910 and/or any special-purpose processors; combinations therefor; or the like. Processor 904 may be a system on a chip (SOC) that includes one or more cores or processors, a bus, memories, clock, memory controller, cache, other processor components, and/or the like. A multi-core processor may be symmetric or asymmetric.

Computing device 900 may include one or more input devices 922 that may represent any number of input mechanisms, such as a microphone, a touch-sensitive screen for graphical input, keyboard, mouse, motion input, speech, media devices, sensors, combinations thereof, or the like. Computing device 900 may include one or more output devices 924 that output data to a user. Such output devices 924 may include, but are not limited to, a media device, projector, television, speakers, combinations thereof, or the like. In some instances, multimodal computing devices can enable a user to provide multiple types of input to communicate with computing device 900. Communications interface 926 may be configured to manage user input and computing device output. Communications interface 926 may also be configured to managing communications with remote devices (e.g., establishing connection, receiving/transmitting communications, etc.) over one or more communication protocols and/or over one or more communication media (e.g., wired, wireless, etc.).

Computing device 900 is not limited to the components as shown if FIG. 9. Computing device 900 may include other components not shown and/or components shown may be omitted.

The following examples illustrate various aspects of the present disclosure. As used below, any reference to a series of examples is to be understood as a reference to each of those examples disjunctively (e.g., "Examples 1-4" is to be understood as "Examples 1, 2, 3, or 4").

Example 1 is a method comprising: receiving a first positioning signal indicating a first geographical location of a user device; determining, based on the first positioning signal, a first media stream to be presented by the user device, wherein the first geographical location is within a broadcast range of the first media stream; facilitating a presentation of the first media stream by the user device; receiving a second positioning signal indicating a second geographical location of the user device; identifying, in response to determining that the second geographical location is different from the first geographical location, a second media stream to be presented by the user device, wherein the second geographical location is within a broadcast range of the second media stream; and facilitating a presentation of the second media stream by the user device.

Example 2 is the method of example(s) 1, wherein the first media stream and the second media stream are radio stations.

Example 3 is the method of any of example(s) 1-2, wherein identifying the second media stream to be presented by the user device is based on one or more characteristics of the first media stream.

Example 4 is the method of any of example(s) 1-3, wherein identifying the second media stream to be presented by the user device is based on a planned route of the user device.

Example 5 is the method of any of example(s) 1-4, wherein the first media stream and the second media stream are received over an Internet Protocol connection.

Example 6 is the method of any of example(s) 1-5, wherein the first media stream and the second media stream correspond to a same genre.

Example 7 is the method of any of example(s) 1-6, wherein identifying the second media stream to be presented by the user device is based on historical media streams requested by the user device.

Example 8 is the method of any of example(s) 1-7, wherein identifying the second media stream to be presented by the user device includes: receiving a predictive model associated with the user device, the predictive model having been generated by training a machine-learning model using an identification of historical media streams presented by the user device; generating a feature vector from an identification of the first media stream, the second geographical location of the user device, and a status of the user device; and executing the predictive model using the feature vector, the predictive model selecting a new media stream from a set of media streams, wherein the user device is in broadcast range of the set of media streams.

Example 9 is the method of any of example(s) 1-8, wherein the first media stream and the second media stream are presented by an in-vehicle entertainment system.

Example 10 is the method of any of example(s) 1-9, wherein the user device is a mobile device.

Example 11 is the method of any of example(s) 1-10, wherein the first positioning signal is received by a global positioning system receiver.

Example 12 is a method comprising: receiving route information corresponding to a route in which a user device is planned to travel; generating a sequence of broadcast sources that includes an identification of a set of broadcast sources; facilitating a first presentation of a first media stream from a first broadcast sources in the sequence of broadcast sources; determining that at least one condition has been satisfied; and facilitating a first presentation of a next media stream from a next broadcast source in the sequence of broadcast sources, the next broadcast source being positioned after the first broadcast source in the sequence of broadcast sources.

Example 13 is the method of any of example(s) 1-12, wherein the condition includes a geolocation of the user device.

Example 14 is the method of any of example(s) 1-13, wherein the condition includes a time interval from a start of the presentation of the first media stream.

Example 15 is the method of any of example(s) 1-14, wherein the condition corresponds to a distance traveled by the user device and wherein determining that at least one condition has been satisfied includes determining that the distance traveled by the user device after a start of the presentation of the first media stream is greater than a threshold.

Example 16 is the method of any of example(s) 1-15, further comprising: determining a frequency with which a new media stream from a new broadcast source in the sequence of broadcast sources is to be presented based on the route information and a quantity of broadcast sources in the sequence of broadcast sources; and defining the condition based on the frequency.

Example 17 is the method of any of example(s) 1-16, wherein the condition being defined such as to cause the presentation of media streams from each broadcast source in the sequence of broadcast sources before the user device reaches a destination identified by the route information.

Example 18 is the method of any of example(s) 1-17, wherein the sequence of broadcast sources includes broadcast sources that broadcast from two or more countries.

Example 19 is the method of any of example(s) 1-18, wherein generating the sequence of broadcast sources includes: determining, based on the route information, a direction of travel of the user device; generating a virtual route that begins at a starting point of the route in which the user device is planned to travel and extends along the direction of travel circumnavigates the Earth until reaching the starting point; identifying a plurality of broadcast sources that broadcast in geographical regions along the virtual route; sorting the plurality of broadcast sources according to an order in which each broadcast source is positioned along the virtual route to generate an ordered plurality of broadcast sources; and selecting, from the ordered plurality of broadcast sources, broadcast sources for inclusion in the sequence of broadcast sources.

Example 20 is a method comprising: displaying a user interface that includes a first representation of a geographical area and a first set of icons representing broadcast sources, each icon being positioned at a location of the geographical area that corresponds to a physical location of the broadcast source; receiving input indicative of a change associated with the geographical area; modifying the user interface to include a second representation of the geographical area based on the change associated with the geographical area and a second set of icons representing broadcast sources; determining a input corresponding to a particular icon of the second set of icons; and facilitating a presentation of a media stream of a broadcast source corresponding to the particular icon of the second set of icons.

Example 21 is a system comprising: one or more processors; and a non-transitory machine-readable medium storing instructions that when executed by the one or more processors, cause the one or more processors to perform any of example(s)s 1-20.

Example 22 is a non-transitory machine-readable medium storing instructions that when executed by one or more processors, cause the one or more processors to perform any of example(s)s 1-20.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored in a form that excludes carrier waves and/or electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Some portions of this description describe examples in terms of algorithms and symbolic representations of operations on information. These operations, while described functionally, computationally, or logically, may be implemented by computer programs or equivalent electrical circuits, microcode, or the like. Furthermore, arrangements of operations may be referred to as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module can be implemented with a computer-readable medium storing computer program code, which can be executed by a processor for performing any or all of the steps, operations, or processes described.

Some examples may relate to an apparatus or system for performing any or all of the steps, operations, or processes described. The apparatus or system may be specially constructed for the required purposes, and/or it may comprise a general-purpose computing device selectively activated or reconfigured by a computer program stored in memory of computing device. The memory may be or include a non-transitory, tangible computer readable storage medium, or any type of media suitable for storing electronic instructions, which may be coupled to a bus. Furthermore, any computing systems referred to in the specification may include a single processor or multiple processors.

While the present subject matter has been described in detail with respect to specific examples, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual examples may be described herein as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method comprising:
receiving a first positioning signal indicating a first geographical location of a user device;
executing a machine-learning model using the first geographical location and an identification of the user device, wherein the machine-learning model is configured to output an identification of a first set of broadcast sources that are within a predetermined distance from the first geographical location, and wherein the first set of broadcast sources are broadcast sources that are likely to be of interest to a user of the user device;
generating, based on the first geographical location of the user device and the first set of broadcast sources, a graphical user interface including a representation of a geographical area including the first geographical location, wherein the graphical user interface includes a set of icons representing locations of the first set of broadcast sources within the geographical area;
determining, based on the first positioning signal, a first media stream associated with an icon of the set of icons, wherein the first media stream is configured to be presented by the user device, and wherein the first geographical location is within a broadcast range of the first media stream;
facilitating a presentation of the first media stream over an Internet connection of the user device;
receiving a second positioning signal indicating a second geographical location of the user device, wherein the second geographical location is outside the broadcast range of the first media stream;
updating, based on the second geographical location of the user device, the graphical user interface to include a representation of a new geographical area including the second geographical location, wherein the machine-learning model is configured to output an identification of a second set of broadcast sources that are within a predetermined distance from the second geographical location;

identifying a second media stream of a broadcast source of the second set of broadcast sources, the second media stream configured to be presented by the user device, wherein identifying the second media stream is in response to determining that the second geographical location is outside the broadcast range of the first media stream, and wherein the second geographical location is within a broadcast range of the second media stream; and facilitating a presentation of the second media stream by the user device over the Internet connection of the user device.

2. The method of claim 1, wherein the first media stream and the second media stream are radio stations.

3. The method of claim 1, wherein identifying the second media stream to be presented by the user device is based on one or more characteristics of the first media stream.

4. The method of claim 1, wherein identifying the second media stream to be presented by the user device is based on a planned route of the user device.

5. The method of claim 1, wherein the first media stream and the second media stream are received over an Internet Protocol connection.

6. The method of claim 1, wherein identifying the second media stream to be presented by the user device is based on historical media streams requested by the user device.

7. The method of claim 1, wherein the first media stream and the second media stream are presented by an in-vehicle entertainment system.

8. A system comprising:
one or more processors; and
a non-transitory machine-readable medium storing instructions that when executed by the one or more processors, cause the one or more processors to perform operations including:
receiving a first positioning signal indicating a first geographical location of a user device;
executing a machine-learning model using the first geographical location and an identification of the user device, wherein the machine-learning model is configured to output an identification of a first set of broadcast sources that are within a predetermined distance from the first geographical location, and wherein the first set of broadcast sources are broadcast sources that are likely to be of interest to a user of the user device;
generating, based on the first geographical location of the user device and the first set of broadcast sources, a graphical user interface including a representation of a geographical area including the first geographical location, wherein the graphical user interface includes a set of icons representing locations of the first set of broadcast sources within the geographical area;
determining, based on the first positioning signal, a first media stream associated with an icon of the set of icons, wherein the first media stream is configured to be presented by the user device, and wherein the first geographical location is within a broadcast range of the first media stream;
facilitating a presentation of the first media stream over an Internet connection of the user device;
receiving a second positioning signal indicating a second geographical location of the user device, wherein the second geographical location is outside the broadcast range of the first media stream;

updating, based on the second geographical location of the user device, the graphical user interface to include a representation of a new geographical area including the second geographical location, wherein the machine-learning model is configured to output an identification of a second set of broadcast sources that are within a predetermined distance from the second geographical location;

identifying a second media stream of a broadcast source of the second set of broadcast sources, the second media stream configured to be presented by the user device, wherein identifying the second media stream is in response to determining that the second geographical location is outside the broadcast range of the first media stream, and wherein the second geographical location is within a broadcast range of the second media stream; and facilitating a presentation of the second media stream by the user device over the Internet connection of the user device.

9. The system of claim 8, wherein the first media stream and the second media stream are radio stations.

10. The system of claim 8, wherein identifying the second media stream to be presented by the user device is based on one or more characteristics of the first media stream.

11. The system of claim 8, wherein identifying the second media stream to be presented by the user device is based on a planned route of the user device.

12. The system of claim 8, wherein the first media stream and the second media stream are received over an Internet Protocol connection.

13. The system of claim 8, wherein identifying the second media stream to be presented by the user device is based on historical media streams requested by the user device.

14. The system of claim 8, wherein the first media stream and the second media stream are presented by an in-vehicle entertainment system.

15. A non-transitory machine-readable medium storing instructions that when executed by one or more processors, cause the one or more processors to perform operations including:

receiving a first positioning signal indicating a first geographical location of a user device;

executing a machine-learning model using the first geographical location and an identification of the user device, wherein the machine-learning model is configured to output an identification of a first set of broadcast sources that are within a predetermined distance from the first geographical location, and wherein the first set of broadcast sources are broadcast sources that are likely to be of interest to a user of the user device;

generating, based on the first geographical location of the user device and the first set of broadcast sources, a graphical user interface including a representation of a geographical area including the first geographical location, wherein the graphical user interface includes a set of icons representing locations of the first set of broadcast sources within the geographical area;

determining, based on the first positioning signal, a first media stream associated with an icon of the set of icons, wherein the first media stream is configured to be presented by the user device, and wherein the first geographical location is within a broadcast range of the first media stream;

facilitating a presentation of the first media stream over an Internet connection of the user device;

receiving a second positioning signal indicating a second geographical location of the user device, wherein the second geographical location is outside the broadcast range of the first media stream;

updating, based on the second geographical location of the user device, the graphical user interface to include a representation of a new geographical area including the second geographical location, wherein the machine-learning model is configured to output an identification of a second set of broadcast sources that are within a predetermined distance from the second geographical location;

identifying a second media stream of a broadcast source of the second set of broadcast sources, the second media stream configured to be presented by the user device, wherein identifying the second media stream is in response to determining that the second geographical location is outside the broadcast range of the first media stream, and wherein the second geographical location is within a broadcast range of the second media stream; and facilitating a presentation of the second media stream by the user device over the Internet connection of the user device.

16. The non-transitory machine-readable medium of claim 15, wherein the first media stream and the second media stream are radio stations.

17. The non-transitory machine-readable medium of claim 15, wherein identifying the second media stream to be presented by the user device is based on one or more characteristics of the first media stream.

18. The non-transitory machine-readable medium of claim 15, wherein identifying the second media stream to be presented by the user device is based on a planned route of the user device.

19. The non-transitory machine-readable medium of claim 15, wherein identifying the second media stream to be presented by the user device is based on historical media streams requested by the user device.

20. The non-transitory machine-readable medium of claim 15, wherein the first media stream and the second media stream are presented by an in-vehicle entertainment system.

* * * * *